US010907875B2

(12) United States Patent
Yeom et al.

(10) Patent No.: US 10,907,875 B2
(45) Date of Patent: Feb. 2, 2021

(54) ICE MAKER AND REFRIGERATOR INCLUDING THE SAME

(71) Applicant: LG Electronics Inc., Seoul (KR)

(72) Inventors: Seungseob Yeom, Seoul (KR); Donghoon Lee, Seoul (KR); Donghoon Lee, Seoul (KR); Wookyong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 55 days.

(21) Appl. No.: 16/256,112

(22) Filed: Jan. 24, 2019

(65) Prior Publication Data

US 2019/0234668 A1 Aug. 1, 2019

(30) Foreign Application Priority Data

Jan. 26, 2018 (KR) .................. 10-2018-0009972

(51) Int. Cl.
*F25C 5/08* (2006.01)
*F25B 5/02* (2006.01)
(Continued)

(52) U.S. Cl.
CPC .................. *F25C 5/08* (2013.01); *F25B 5/02* (2013.01); *F25B 49/02* (2013.01); *F25C 1/04* (2013.01);
(Continued)

(58) Field of Classification Search
CPC .... F25C 5/08; F25C 2400/10; F25C 2600/04; F25B 5/02; F25B 2700/2104; F25D 11/022; F25D 17/065; F25D 29/00; F25D 2317/061; F25D 2317/0682; F25D 2700/121; F25D 2700/122
See application file for complete search history.

(56) References Cited

U.S. PATENT DOCUMENTS 2,866,322 A 12/1958 Muffly
2007/0119193 A1 5/2007 Davis et al.
2011/0302938 A1* 12/2011 Lee ...................... F25D 17/065
62/89

OTHER PUBLICATIONS

Extended European Search Report in European Application No. 19152757.1, dated May 31, 2019, 11 pages.

* cited by examiner

*Primary Examiner* — Marc E Norman
(74) *Attorney, Agent, or Firm* — Fish & Richardson P.C.

(57) ABSTRACT

A control method of a refrigerator includes: determining whether a first temperature of a refrigerating compartment satisfies a first temperature condition; based the first temperature satisfying the first temperature condition, determining whether a second temperature of a freezing compartment satisfies a second temperature condition; based on the second temperature satisfying the second temperature condition, determining (i) whether a third temperature of an ice making compartment satisfies a third temperature condition and (ii) whether a driving time for ice making has passed; maintaining operation of a compressor while determining (i) whether the second temperature satisfies the second temperature condition, (ii) whether the third temperature satisfies the third temperature condition, and (iii) whether the driving time has passed; and stopping operation of the compressor based on at least one of (i) a determination that the third temperature satisfies the third temperature condition or (ii) a determination that the driving time has passed.

20 Claims, 32 Drawing Sheets

(51) Int. Cl.
  *F25B 49/02* (2006.01)
  *F25D 11/02* (2006.01)
  *F25D 17/06* (2006.01)
  *F25C 1/04* (2018.01)
  *F25C 1/24* (2018.01)
  *F25C 5/20* (2018.01)
  *F25D 29/00* (2006.01)
  *F25D 23/04* (2006.01)

(52) U.S. Cl.
  CPC .......... *F25C 1/24* (2013.01); *F25C 5/22* (2018.01); *F25D 11/022* (2013.01); *F25D 17/065* (2013.01); *F25D 23/04* (2013.01); *F25D 29/00* (2013.01); *F25B 2341/062* (2013.01); *F25B 2600/01* (2013.01); *F25B 2600/0251* (2013.01); *F25B 2600/112* (2013.01); *F25B 2600/2511* (2013.01); *F25B 2700/2104* (2013.01); *F25C 2400/10* (2013.01); *F25C 2400/14* (2013.01); *F25C 2500/08* (2013.01); *F25C 2600/04* (2013.01); *F25C 2700/04* (2013.01); *F25C 2700/06* (2013.01); *F25C 2700/14* (2013.01); *F25D 2317/061* (2013.01); *F25D 2317/0682* (2013.01); *F25D 2700/121* (2013.01); *F25D 2700/122* (2013.01)

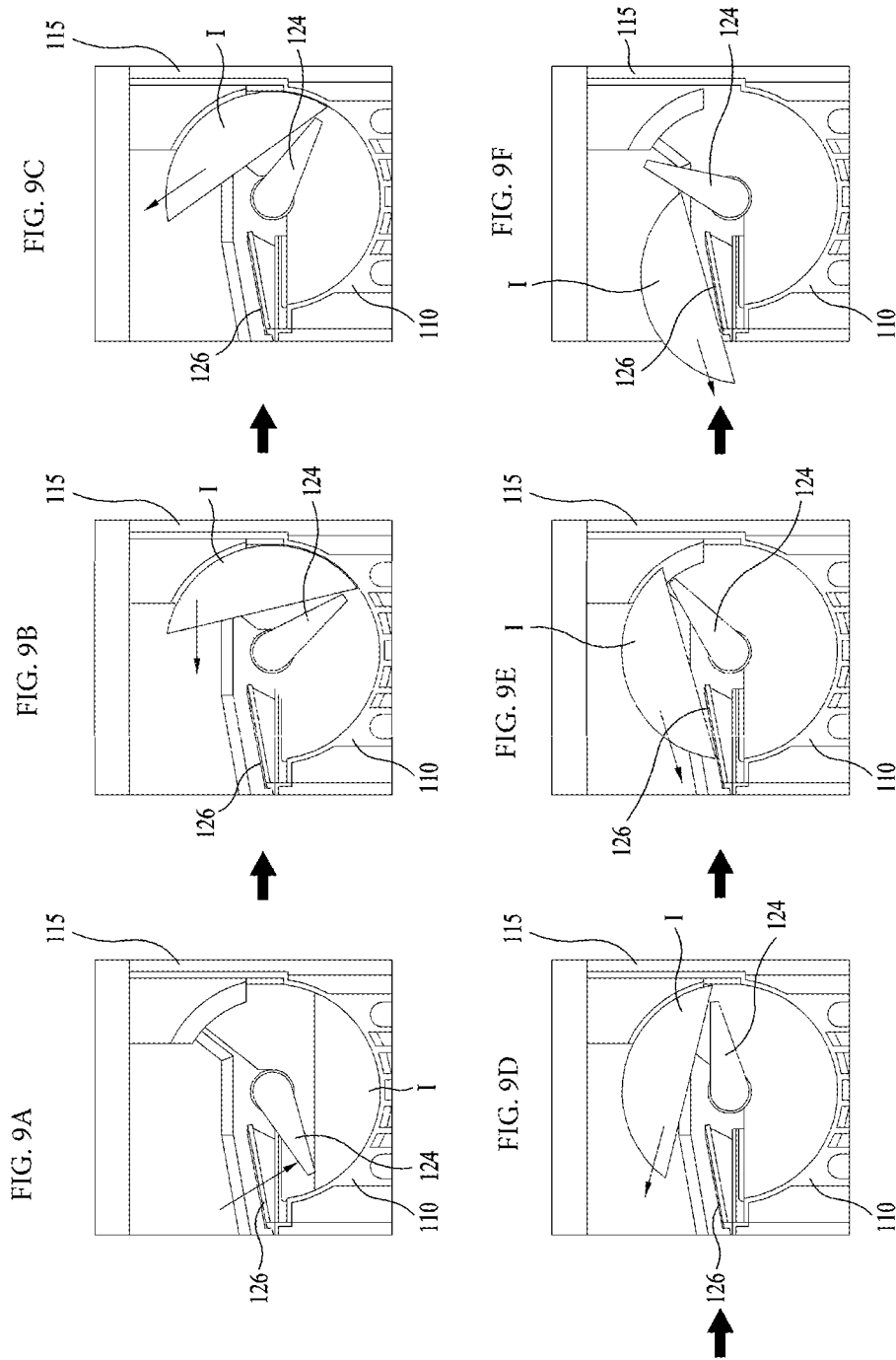

FIG. 26

|  | R-satisfaction | F-satisfaction |  |
|---|---|---|---|
|  | R-driving | F-driving | I-driving | refrigerating compartment fan — ON freezing compartment fan — ON ice making compartment fan — ON

ICE MAKER AND REFRIGERATOR INCLUDING THE SAME

CROSS-REFERENCE TO RELATED APPLICATIONS

This application claims the benefit of the Korean Patent Application No. 10-2018-0009972 filed on Jan. 26, 2018, which is hereby incorporated by reference as if fully set forth herein.

TECHINCAL FIELD

The present disclosure relates to an ice maker and a refrigerator including the same, and more particularly, to an ice maker and a refrigerator including the same, in which an ice making amount is increased, ice separation is easily made and energy efficiency is improved.

BACKGROUND

A refrigerator is an apparatus that can store food items and keep the food items fresh for a certain time. In some examples, the refrigerator may have a food storage compartment that maintains a low temperature state by a cooling cycle to allow food items to be maintained at a fresh state.

In some cases, the food storage compartment may include a plurality of storage compartments having their respective properties different from each other to allow a user to select a storage method suitable for each food item by considering types and features of the food items and storage periods of the food items. For instance, the storage compartment may include a refrigerating compartment and a freezing compartment.

In some examples, when a user desires to drink a beverage or water together with ice pieces, the user may open a freezing compartment door and take ice pieces out of an ice tray in the freezing compartment. In some cases, it may be inconvenient for the user to separate ice pieces from the ice tray after opening the freezing compartment door and then taking the ice tray out of the freezing compartment. In some cases, when the user opens the freezing compartment door, cool air of the freezing compartment may discharge to an outside, which may increase a temperature of the freezing compartment. In some cases, a compressor may be driven to decrease the temperature of the freezing compartment.

An automatic ice maker may be disposed inside a refrigerator and discharge ice pieces separated from the ice tray through a dispenser. The automatic ice maker may automatically supply water to the ice tray to make the ice pieces.

SUMMARY

The present disclosure describes an ice maker and a refrigerator including the same.

One object of the present disclosure is to provide an ice maker and a refrigerator including the same, in which ice separation is easily made to reduce energy consumption while ice separation is being made.

Another object of the present disclosure is to provide an ice maker and a refrigerator including the same, in which the cool air is easily transferred to ice pieces during ice making to increase an ice making amount and thus improve energy efficiency.

Another object of the present disclosure is to provide a refrigerator that may increase an ice making amount by increasing the time required to supply the cool air to an ice tray. Particularly, the present disclosure describes a refrigerator that may reduce the time required to make ice pieces by allowing the cool air to be supplied to an ice making compartment only to concentrate the cool air supply to the ice making compartment without supplying the cool air to a freezing compartment.

Another object of the present disclosure is to provide a refrigerator that may efficiently use heat supplied from a heater by stopping an operation of an ice making compartment fan during ice separation. That is, the present disclosure provides a refrigerator that disperses heat of a heater if an ice making compartment fan is driven while ice separation is being made, thereby solving a problem caused as a temperature of an ice tray fails to be increased sufficiently.

Another object of the present disclosure is to provide a refrigerator that may prevent a temperature of an ice making compartment from being remarkably increased due to heat generated from a heater during ice separation to reduce a supply amount of the cool air required during ice making and thus improve energy efficiency.

Another object of the present disclosure is to provide a refrigerator that may increase the time required for ice making by more reducing RPM of an ejector in a state that a door is closed, than RPM of the ejector in a state that the door is not closed. That is, the present disclosure provides a refrigerator that may increase the time required to make ice pieces to increase the amount of ice pieces which are made by setting RPM of the ejector in a state that the door is closed, differently from RPM of the ejector in a state that the door is not closed.

Additional advantages, objects, and features of the disclosure will be set forth in part in the following description and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

According to one aspect of the subject matter described in this application, disclosed is a control method of a refrigerator that includes a compressor configured to compress refrigerant, a first evaporator and a second evaporator that are configured to receive the refrigerant compressed by the compressor, and a valve that defines a path configured to allow the refrigerant supplied from the compressor to move to the first evaporator or to the second evaporator. The control method includes: determining whether a first temperature of a refrigerating compartment of the refrigerator satisfies a first temperature condition of the refrigerating compartment; based on a determination that the first temperature satisfies the first temperature condition, determining whether a second temperature of a freezing compartment of the refrigerator satisfies a second temperature condition of the freezing compartment; based on a determination that the second temperature satisfies the second temperature condition, determining (i) whether a third temperature of an ice making compartment of the refrigerator satisfies a third temperature condition of the ice making compartment and (ii) whether a driving time for ice making has passed; maintaining operation of the compressor while determining (i) whether the second temperature satisfies the second temperature condition, (ii) whether the third temperature satisfies the third temperature condition, and (iii) whether the driving time for ice making has passed; and stopping operation of the compressor based on at least one of (i) a determination that the third temperature satisfies the third temperature condition or (ii) a determination that the driving time for ice making has passed.

Implementations according to this aspect may include one or more of the following features. For example, the control method may further include opening a first path of the valve to allow the refrigerant to move to the first evaporator based on a determination that the first temperature does not satisfy the first temperature condition. In some examples, the control method may further include driving a first fan of the refrigerator configured to blow air cooled by the first evaporator to the refrigerating compartment based on a determination that the first temperature does not satisfy the first temperature condition.

In some implementations, the control method may further include opening a second path of the valve to allow the refrigerant to move to the second evaporator based on a determination that the second temperature does not satisfy the second temperature condition. In some examples, the control method may further include driving a second fan of the refrigerator configured to blow air cooled by the second evaporator to the freezing compartment based on a determination that the second temperature does not satisfy the second temperature condition. In some examples, the control method may further include stopping driving the second fan based on a determination that the second temperature satisfies the second temperature condition. In some examples, the control method may further include driving a third fan of the refrigerator configured to blow air cooled by the second evaporator to the ice making compartment based on a determination that the second temperature satisfies the second temperature condition.

In some implementations, the control method may further include opening a second path of the valve to allow the refrigerant to move to the second evaporator based on at least one of (i) a determination that the third temperature does not satisfy the third temperature condition or (ii) a determination that the driving time for ice making has not passed. In some examples, the control method may further include driving a third fan of the refrigerator configured to blow air cooled by the second evaporator to the ice making compartment based on at least one of (i) a determination that the third temperature does not satisfy the third temperature condition or (ii) a determination that the driving time for ice making has not passed. In some examples, the control method may further include closing a second path of the valve to restrict the refrigerant from moving to the second evaporator based on at least one of (i) a determination that the third temperature satisfies the third temperature condition or (ii) a determination that the driving time for ice making has passed.

In some implementations, driving the third fan includes driving the third fan for a period time without driving the second fan to supply cool air to the ice making compartment for the period time and to not supply cool air to the freezing compartment for the period time.

According to another aspect, a refrigerator includes: a compressor configured to compress refrigerant; a first evaporator and a second evaporator that are configured to receive the refrigerant compressed by the compressor; a valve that defines a path that allows the refrigerant supplied from the compressor to move to the first evaporator or to the second evaporator; a first fan configured to blow air cooled by the first evaporator to a refrigerating compartment of the refrigerator; a second fan configured to blow air cooled by the second evaporator to a freezing compartment of the refrigerator; a third fan configured to blow air cooled by the second evaporator to an ice making compartment of the refrigerator; and a controller. The controller is configured to: open and close the path of the valve; determine (i) whether a temperature of the ice making compartment satisfies a temperature condition of the ice making compartment and (ii) whether a driving time for ice making has passed; and open the path of the valve to allow the refrigerant to move to the second evaporator and drive the compressor and the third fan based on at least one of (i) a determination that the temperature of the ice making compartment does not satisfy the temperature condition or (ii) a determination that the driving time for ice making has not passed.

Implementations according to this aspect may include one or more of the following features. For example, the controller may be further configured to maintain operation of the compressor based on a temperature of the freezing compartment satisfying a temperature condition of the freezing compartment. In some examples, the controller may be further configured to stop driving the second fan based on a temperature of the freezing compartment satisfying a temperature condition of the freezing compartment. In some examples, the controller may be further configured to drive the third fan without driving the second fan for a period of time to supply cool air to the ice making compartment and to not supply cool air to the freezing compartment for the period of time.

In some implementations, the controller may be further configured to: determine whether a first temperature of the refrigerating compartment satisfies a first temperature condition; based on a determination that the first temperature satisfies the first temperature condition, determine whether a second temperature of the freezing compartment satisfies a second temperature condition of the freezing compartment; based on a determination that the second temperature satisfies the second temperature condition, determine (i) whether the temperature of the ice making compartment satisfies the temperature condition of the ice making compartment or (ii) whether the driving time for ice making has passed.

In some examples, the controller may be further configured to: open a first path of the valve to allow the refrigerant to move to the first evaporator based on a determination that the first temperature does not satisfy the first temperature condition. In some examples, the controller may be further configured to drive the first fan based on a determination that the first temperature does not satisfy the first temperature condition. In some examples, the controller may be further configured to open a second path of the valve to allow the refrigerant to move to the second evaporator based on a determination that the second temperature does not satisfy the second temperature condition. In some examples, the controller may be further configured to drive the second fan based on a determination that the second temperature does not satisfy the second temperature condition.

In some implementations, since energy consumption is reduced during ice making or ice separation, energy efficiency of the refrigerator as well as the ice maker may be improved.

In some implementations, since a contact area between water and the ice tray is increased, the water may quickly be cooled by the cool air.

In some implementations, since one ice making space of the ice tray has the same radius as that of another ice making space, ice pieces may move more easily.

In some implementations, since ice pieces generated in the ice tray have a forward moving direction relatively thicker than a backward moving direction, it is not likely that the ice pieces remain in the ice tray without being discharged from the ice tray, whereby reliability in ice separation of the ice maker may be improved.

In some implementations, since the time required to supply the cool air to the ice tray is increased, the ice making amount may be increased.

In some implementations, since an operation of the ice making compartment fan is stopped during ice separation, heat supplied from the heater may efficiently be used. Therefore, energy consumed by the heater is reduced, whereby overall energy efficiency of the refrigerator may be improved.

In some implementations, the amount of heat supplied by the heater to make ice separation is reduced, whereby the amount of the cool air to be supplied for later ice making may be reduced. That is, since ice making is available using less energy, energy consumed by the refrigerator may be reduced.

In some implementations, an RPM of the ejector in a state that the door is closed is more reduced than that of the ejector in a state that the door is not closed, whereby the time required for ice making may be increased. Therefore, the time required to rotate the ejector within the same time may be reduced, whereby the amount of ice pieces that may be made by the refrigerator may be increased.

It is to be understood that both the foregoing general description and the following detailed description of the present disclosure are exemplary and explanatory and are intended to provide further explanation of the disclosure as claimed.

BRIEF DESCRIPTION OF THE DRAWINGS

FIGS. 9A to 9F are views illustrating an example process of discharging ice pieces.

FIG. 26 is a view illustrating an example operation of a refrigerator.

DETAILED DESCRIPTION

Reference will now be made in detail to one or more implementations of the present disclosure, examples of which are illustrated in the accompanying drawings.

Figure 1:
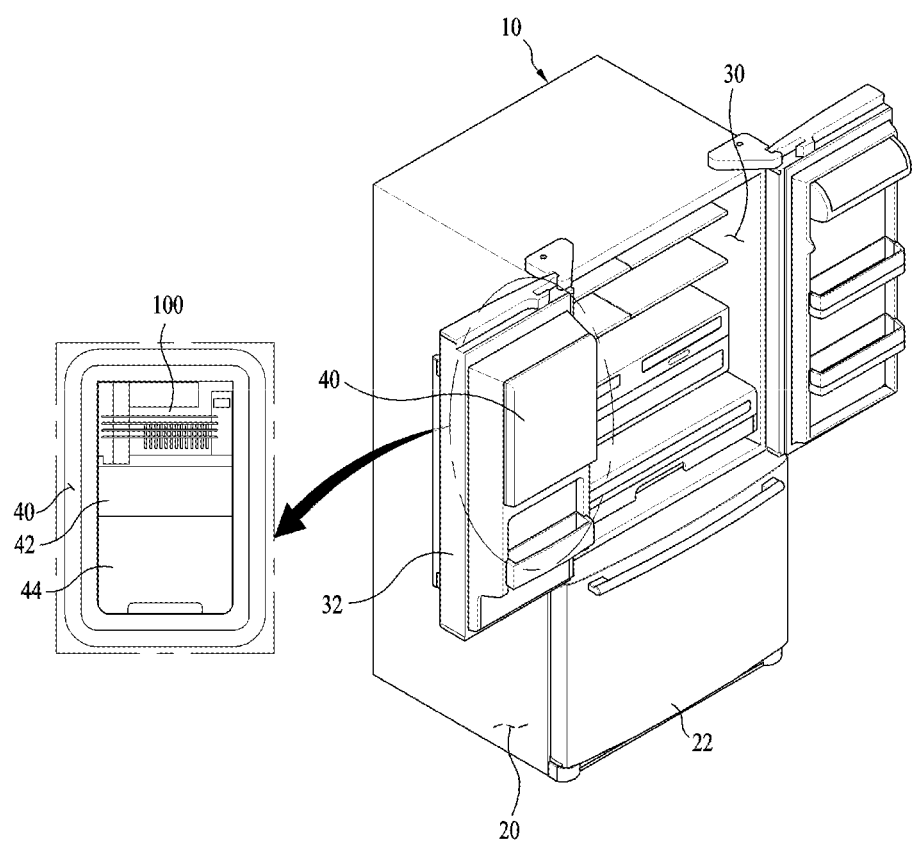
FIG. 1 is a perspective view illustrating an example ice maker disposed in an example refrigerator door.

FIG. 1 is a perspective view illustrating an example ice maker disposed in an example refrigerator door.

The ice maker may be applied to a bottom freezer type refrigerator in which a freezing compartment is arranged below a refrigerating compartment or a top mounting type refrigerator in which a freezing compartment is arranged on a refrigerating compartment. In some implementations, the ice maker may be applied to a side by side type refrigerator in which a refrigerating compartment and a freezing compartment are arranged at both sides.

A refrigerator includes a freezing compartment 20 and a refrigerating compartment 30, in which contents are stored in a cabinet 10 constituting an external appearance. A freezing compartment door 22 and a refrigerating compartment door 32, which are intended to open or close the freezing compartment 20 and the refrigerating compartment, are respectively provided on front surfaces of the freezing compartment 20 and the refrigerating compartment 30. In this implementation, a bottom freezing type refrigerator, in which the freezing compartment 20 is arranged below the cabinet 10, is introduced, but the present disclosure is not limited to this bottom freezing type refrigerator.

The refrigerating compartment 30 is opened or closed at both sides in such a manner that two refrigerating compartment doors 32 are hinge-coupled with a side of a refrigerator main body, and the freezing compartment door 50 is opened or closed in a forward or backward direction of the refrigerator body in a sliding manner.

The freezing compartment door 22 and the refrigerating compartment door 32 may be arranged differently depending positions of the freezing compartment 20 and the refrigerating compartment 30. For example, the refrigerator may be applied to a top mount type refrigerator, a two-door type refrigerator, etc. regardless of types.

An ice making compartment 40 may be provided in any one of the refrigerating compartment doors 32. A sealed space surrounded by a frame is provided at a rear side of the refrigerating compartment door 32, and may form the ice making compartment 40. In some examples, the ice making compartment 40 may be adjacent to the refrigerating compartment 30, and the ice making compartment 40 may be heat-insulated so as not to generate heat-exchange with the refrigerating compartment 30.

The ice making compartment 40 may be provided inside the freezing compartment 20 or the refrigerating compartment 30. In some cases, considering a user's access convenience and efficiency in use of an inner space of the cabinet 10, the ice making compartment 40 may be disposed in the refrigerating compartment door 32.

The ice maker 100 according to the present disclosure is provided inside the ice making compartment 40, and an ice bank 42 and a dispenser 44 are provided below the ice making compartment 40, wherein ice pieces are temporarily stored in the ice bank 42 and the dispenser 44 is to discharge ice pieces in accordance with a user's request.

Figure 2:
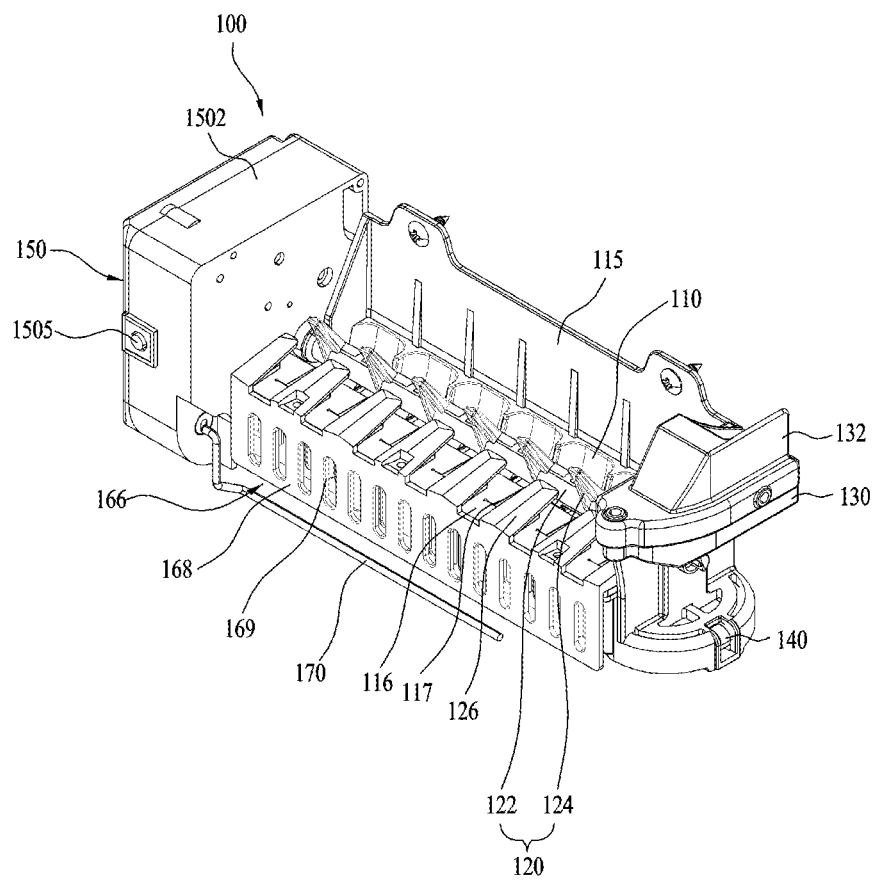
FIG. 2 is a perspective view illustrating an example ice maker.
Figure 3:
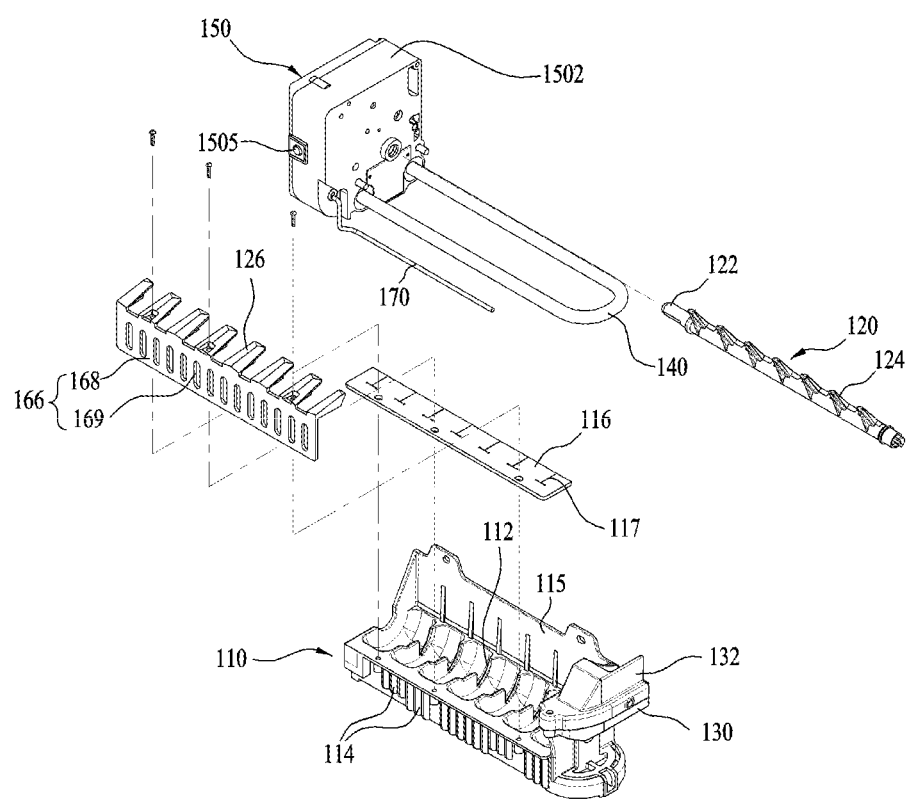
FIG. 3 is an exploded view illustrating the ice maker of FIG. 2.

A perspective view illustrating an external appearance of the ice maker 100 is shown in FIG. 2, and an exploded view illustrating the ice maker 100 is shown in FIG. 3.

The ice maker 100 of the present disclosure includes an ice tray 110 to which water supplied to make ice pieces, an ejector 120 rotated to take out ice pieces made in the ice tray, a heater 140 provided to be in contact with the ice tray, selectively heating the ice tray to easily separate the ice pieces from the ice tray, a case 1502 mounted at one side of the ice tray, and a brushless direct current motor (BLDC) 1510 mounted inside the case 1502, selectively rotating the ejector 120 to enable forward rotation and backward rotation.

The ice tray 110 is a structure where ice pieces are formed by water supply, and has a semi-cylindrical shape with an opened upper portion to store water and ice pieces therein as shown in FIG. 3.

A plurality of partition ribs 112 for partitioning the inner space of the ice tray 110 into a plurality of ice making spaces are provided inside the ice tray 110. The plurality of partition ribs 112 are formed to be extended upwardly inside the ice tray 110. The plurality of partition ribs 112 may allow a plurality of ice pieces to be simultaneously made in the ice tray.

A water supply unit 130 is provided at a right upper portion of the ice tray 110 to allow water to be supplied from an externally connected water supply hose to the ice tray 110.

The water supply unit 130 has an opened upper portion, and may include a water supply unit cover 132 for preventing water from splashing during water supply.

In some implementations, the ice tray 110 includes an anti-overflow wall 115 for preventing water from overflowing, formed to be extended from a rear upper surface to an upward direction. If the ice maker 100 is provided in the refrigerating compartment door 32, water supplied to the ice tray 110 may overflow in accordance with movement of a door which is generally rotated to be opened or closed. Therefore, the anti-overflow wall 115 forms a high wall at a rear side of the ice tray 110 to prevent water inside the ice tray 110 from overflowing toward the rear of the ice tray 110.

The ejector 120 includes a rotary shaft 122 and a plurality of protrusion pins 124. The rotary shaft 122 is arranged at an upper side inside the ice tray 110 to cross the center in a length direction as shown in FIG. 3. The inner surface of the ice tray 110 has a semi-cylindrical shape having the center of the rotary shaft 122 as the center. The plurality of protrusion pins 124 are extended to an outer circumference of the rotary shaft 122 in a radius direction. In some implementations, the plurality of protrusion pins 124 are formed at the same interval along the length direction of the rotary shaft 122. Particularly, the plurality of protrusion pins 124 are arranged one by one per space partitioned in the ice tray 110 by the partition ribs 112.

The heater 140 is arranged below the ice tray 110. The heater 140 is a heat transfer heater, and may have a U shape, for example. The heater 140 heats the surface of the ice tray 110 to slightly melt ice on the surface of the ice tray 110. Therefore, when the ejector 120 separates ice pieces while being rotated, ice pieces on the surface of the ice tray 110 may easily be separated from the surface of the ice tray 110.

In some implementations, a plurality of discharge guides 126 for guiding ice pieces separated by the ejector 120 to be dropped on the ice bank 42 arranged below the ice maker 100 are provided above the front of the ice tray 110. The plurality of discharge guides 126 are fixed to corner portions at the front of the ice tray 110 and extended to be close to the rotary shaft 122. A predetermined gap exists between the plurality of discharge guides 126. When the rotary shaft 122 is rotated, the protrusion pins 124 pass through the gap. In some implementations, the discharge guide 126 has an upper surface inclined to be higher toward its end, that is, the rotary shaft 122 to allow ice pieces to be slid to the front by means of self-load.

Preferably, the ice tray 110 further includes an anti-overflow member 116 for preventing water from overflowing toward the front of the ice tray, provided below the discharge guide 126. Preferably, the anti-overflow member 116 is made in a plate shape to prevent water from overflowing, and is made of a flexible plastic material.

Also, when the ejector 120 is rotated, the anti-overflow member 116 are formed provided with "T" shaped slits 117 per position corresponding to the protrusion pins 124 such that the protrusion pins 124 may pass through the anti-overflow member 116. Since the anti-overflow member 116 is made of a flexible material, when the protrusion pins 124 pass through the slit 117, the slit 117 may generate a gap while being deformed, and then may be restored after the protrusion pins 124 pass therethrough.

A driving device 150 for selectively rotating the ejector 120 is provided at an opposite side of the water supply unit 130 in the ice tray 110.

Figure 4:
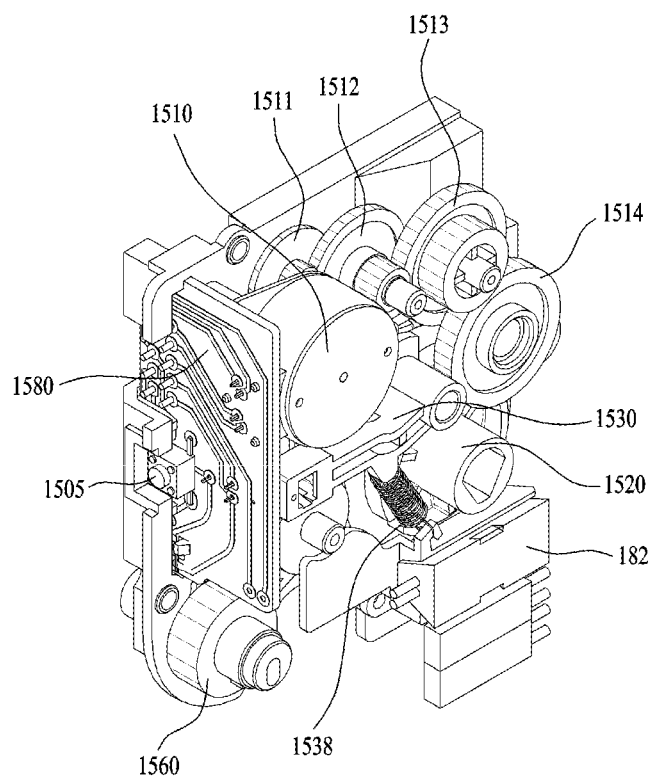
FIG. 4 is a perspective view illustrating an inside of an example driving unit in FIG. 3.

The driving device 150 is provided inside the case 1502 to protect inner parts, and includes a motor 1504 (see FIG. 4) inside the case 1502 as described later. The driving device 150 selectively supplies a power source to the motor 1510 and the heater 140.

Also, the motor 1510 selectively rotates a full-ice sensing bar for sensing whether the ice bank 42 arranged below the ice maker 100 is fully filled with ice pieces.

In some implementations, a switch 1505 for experimentally operating the ice maker 100 is provided at the front of the driving device 150. If the switch 1505 is pushed for several seconds or more, the ice maker 100 is operated in a test mode to identify whether there is a problem in the ice maker 100.

The ice maker 100 is provided with an air guide 166 arranged to surround the front below the ice tray 110. The air guide 166 is provide to surround the front of the ice tray 110, a cool air moving path is formed between the air guide 166 and the front surface of the ice tray 110, and a plurality of cool air discharge holes 169 may be arranged at the center of the front portion 168 from side to side. The cool air guided to the lower portion of the ice tray 110 may be discharged to the front surface of the ice maker 100 through the cool air discharge holes 169.

In some implementations, a plurality of fins 114 are formed on the entire surface of the ice tray 110 spaced apart from the front portion 168. The fins 114 may expedite heat transfer to the ice tray 110 when the cool air is discharged through the cool air discharge holes 169, whereby water may quickly be cooled to quickly generate ice pieces.

The front portion 168 of the air guide 166 may be formed in a single body with the discharge guide 126. In this case, the discharge guide 126 and the anti-overflow member 116 may be fixed to each other using a plurality of screws at the front on the ice tray 110, whereby the front portion 168 may be fixed to the front surface of the ice tray 110 to be spaced apart from the ice tray 110 at a predetermined interval.

Next, a structure of the driving device will be described with reference to FIGS. 4 to 8B.

The driving device 150 includes a case 1502 mounted at one side of the ice tray, and a motor 1510 mounted inside the case, selectively rotating the ejector.

The case 1502 has a cuboid shape, is provided with mounting portions such as various gears and cams therein, and has an opened side to which a cover is coupled.

The motor 1510 rotates the rotary shaft 122 of the ejector 120 at a predetermined angle in a forward or backward direction. To this end, the motor 1510 may be a motor that enables forward or backward rotation. For example, the motor 1510 may be a brushless direct current motor (BLDC).

If the motor 1510 is rotated in a forward or backward direction, a complicated connection structure of a gear and cam for rotating the ejector 120 in a forward or backward direction is not required, and it is easy to rotate the full-ice sensing bar 170, in a forward or backward direction, which may be rotated at a predetermined angle in a forward or backward direction.

In some example, where the brushless direct current motor is used, since a volume of the motor is smaller than the case that the direct current motor is used, the driving device may have a small volume, whereby the ice tray 110 may be made more greatly in a limited space.

The motor 1510 is deaccelerated through a plurality of reduction gears 1511, 1512, 1513 and 1514 and then axially coupled to the rotary shaft 122 of the ejector 120 to rotate an ejector rotation gear 1520 for rotating the ejector. At this time, since the motor 1510 may be rotated in a forward or backward direction, if the motor is rotated in a first direction, the ejector is rotated in the first direction, and if the motor is rotated in a second direction, the ejector is rotated in the second direction.

Also, the plurality of four reduction gears 1511, 1512, 1513 and 1514 are shown, a reduction ratio and the number of the plurality of reduction gears may be controlled properly in accordance with specification of the motor 1510.

Preferably, the motor 1510 is connected to a circuit board 1580 provided at one side inside the case 1502 and thus supplied with a power source.

In some implementations, the driving device 150 further includes a first sensor unit for sensing a position of a rotation angle of the ejector, and a second sensor unit for sensing a rotation angle position of the full-ice sensing bar. Each of the first sensor unit and the second sensor unit may include a hall sensor to sense related information.

A first cam portion 1522 provided with two grooves made of a disk type and formed at a predetermined angle position on the outer circumference is provided at one side of the ejector rotation gear 1520. The two grooves include a first groove 1523 for defining an initial rotation angle position of the ejector 120 and a second groove 1524 formed to be spaced apart from the first groove 1523 at a predetermined angle. The first groove 1523 is formed at the same depth as that of the second groove 1524, and is, in some examples, formed at an angle greater than that of the second groove 1524.

A first rotation member 1530 interworking with the first cam portion 1522 in contact with the first cam portion 1522 is provided at one side of the ejector rotation gear 1520. The first rotation member 1530 is provided with a first protrusion 1532 at one side, and the first protrusion 1532 is rotated while sliding along the outer circumference and two grooves of the first cam portion 1522.

A magnet 1534 is provided at an end of the first rotation member 1530, and a first hall sensor 1536 for measuring a voltage signal generated as the magnet 1534 approaches to a position close to the magnet 1534 is provided.

The first hall sensor 1536 is a sensor based on a hall effect of a voltage generated when the magnet 1534 approaches thereto. In some examples, the first hall sensor 1536 may be a sensor to which a current flows, and the first hall sensor 1536 may be installed in the circuit board 1580.

Since the first rotation member 1530 is pulled to be always in contact with the first cam portion 1522, a first elastic member 1538 is provided between one side of the first rotation member 1530 and a lower fixed position in the case 1502 to be in contact with the first cam portion 1522 by downwardly pulling the first rotation member 1530.

Figure 5:
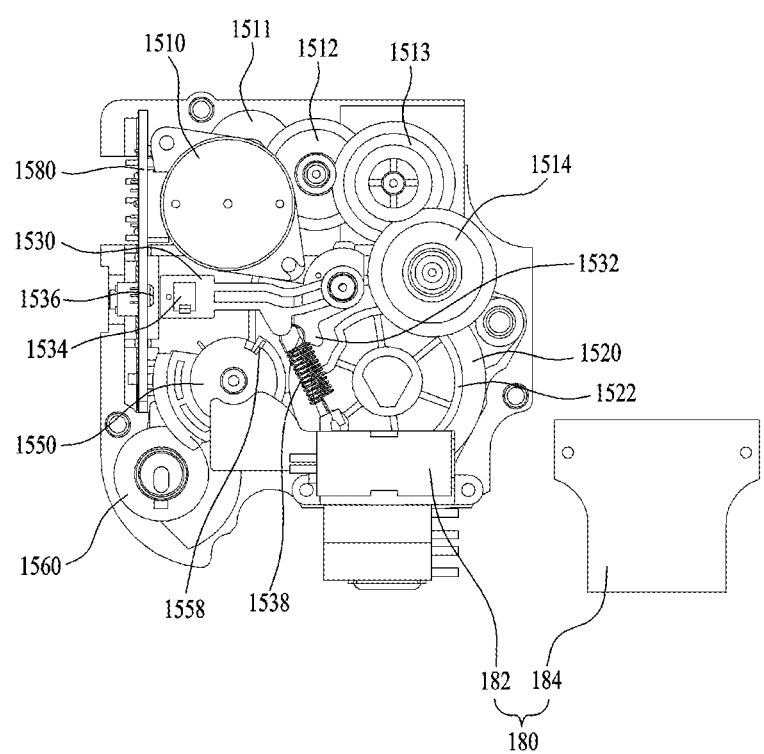
FIG. 5 is a right side view of the driving unit of FIG. 4.

As shown in FIG. 5, in some implementations, the first elastic member 1538 may be installed to be hung between a protrusion downwardly protruded from a middle portion of the first rotation member 1530 and a ring protruded from a position where a temperature sensor 182, which will be described later, is fixed.

The first sensor unit, which includes the first rotation member 1530 and the first hall sensor 1536, may sense a rotation angle of the ejector 120 by sensing a position signal, which corresponds to a case that the first protrusion 1532 is inserted into the first groove 1523 and the second groove 1524 of the first cam portion 1522, when the ejector rotation gear 1520 is rotated.

In some implementations, a temperature sensor unit 180 is provided inside the case 1502 of the driving device 150 to adjoin a side of the ice tray 110 coupled to the side of the case 1502. The temperature sensor unit 180 includes a temperature sensor 182 for measuring a voltage signal according to a temperature of the ice tray 110, and a conducting plate 184 of a metal material interposed to prevent water permeation with the ice tray 110.

The temperature sensor 182 may be buried in a rubber of a waterproof and elastic material, and may be fixed to one side of the case 1502. Since the temperature sensor 182 is to measure a temperature of the ice tray 110, an opening portion, through which the temperature sensor 182 may be exposed, is formed at one side of the case 1502 made of a plastic material.

The temperature sensor 182 is not directly in contact with the ice tray 110 but in contact with the ice tray 110 through the conducting plate 184. Therefore, the conducting plate 184 may prevent water permeation by blocking the opening portion formed at one side of the case 1502 and at the same time measure a temperature of the ice tray 110 to be conducted to the temperature sensor 182. The conducting plate 184 may be made of a metal material having high heat conductivity, and may be fixed to one side of the case 1502 by insert molding after a plate of a stainless material is formed.

Also, since the temperature sensor 182 measures a voltage change according to a temperature change, the temperature sensor 182 is connected with the circuit board 1580 by a wire.

Figure 6:
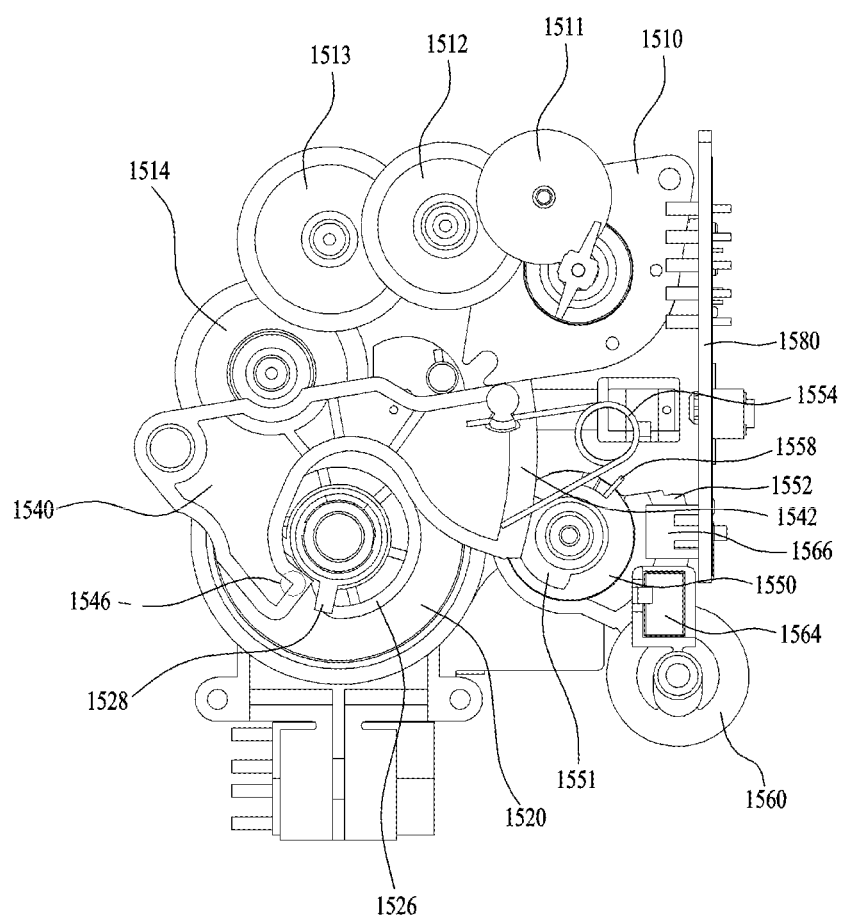
FIG. 6 is a left side view of the driving unit of FIG. 4.

Next, a side view illustrating that the inside of the driving device is viewed from a left side is shown in FIG. 6.

A disk type second cam portion 1526 having a diameter corresponding to a half of a diameter of the ejector rotation gear 1520 is provided at a left side of the ejector rotation gear 1520. A groove 1527 is formed at one side of the second cam portion 1526.

A second rotation member 1540 rotated by interworking with the second cam portion 1526 is provided near the second cam portion 1526. The second rotation member 1540 is rotated at the front of the second cam portion 1526, and is entirely provided to surround the center of the ejector rotation gear 1520. A second protrusion 1546 is formed on a surface at one end of the second rotation member 1540, that is, a surface toward the second cam portion 1526 to be vertical to the surface, whereby a side of the second protrusion 1546 is in contact with an outer circumference of the second cam portion 1526.

The other end of the ejector rotation gear 1520 receives an elastic force to be upwardly rotated by the second elastic member 1554. The second elastic member 1554 has both ends longitudinally spread in a spring type, and provides an elastic force spread in a radius direction unlike the first elastic member 1538 that provides an elastic force pulled in a length direction. One side of the second elastic member 1554 is installed to be hung in a ring portion protruded at the other end of the ejector rotation gear 1520, and other side of the second elastic member 1554 is installed to be hung on one surface of the case.

A protrusion 1528 is formed at one side of the front of the second cam portion 1526 in the rotary shaft of the ejector rotation gear 1520 in a radius direction. The protrusion 1528 is mounted to be rotated at a predetermined angle range with respect to the rotary shaft of the ejector rotation gear 1520. The protrusion 1528 is rotated at a predetermined angle in the same direction as that of the ejector rotation gear 1520 when the ejector rotation gear 1520 is rotated counterclockwise, whereby the second protrusion 1546 of the second rotation member 1540 may be inserted into the groove 1527 of the second cam portion 1526. On the other hand, the protrusion 1528 is rotated at a predetermined angle in the same direction as that of the ejector rotation gear 1520 when the ejector rotation gear 1520 is rotated clockwise, and is hung in a side of one end of the second protrusion 1546 of the second rotation member 1540, whereby the second protrusion 1546 cannot be inserted into the groove 1527 of the second cam portion 1526 and thus the second rotation member 1540 cannot be rotated.

In other words, the protrusion 1528 may upwardly rotate the second rotation member 1540 only when the ejector rotation gear 1520 is rotated counterclockwise.

An arc shaped large gear portion 1542 is formed at the other end of the ejector rotation gear 1520 and thus coupled with a rotation force transfer gear 1550. Since the arc shaped large gear portion 1542 is rotated in the range of a predetermined angle, the large gear portion 1542 is formed in an arc shape.

The rotation force transfer gear 1550 includes an arc shaped small gear portion 1551 rotated to be engaged with the arc shaped large gear portion 1542, and an arc shaped large gear portion 1552 engaged with the ejector rotation gear 1520, rotating the ejector rotation gear 1520.

Since a rotation angle of the rotation force transfer gear 1550 becomes greater than the arc shaped large gear portion 1542 but does not exceed 180°, the small gear portion 1551 and the large gear portion 1552 may be formed in an arc shape. The arc shaped large gear portion 1552 rotates a full-ice sensing bar rotation gear 1560 to which one end of the full-ice sensing bar 170 is axially coupled.

A third elastic member 1558 is provided between the arc shaped small gear portion 1551 and the arc shaped large gear portion 1552, wherein the arc shaped large gear portion 1552 is rotatably coupled to the third elastic member 1558 relatively with respect to the arc shaped small gear portion. The third elastic member 1558 is a spring fitted into the rotary shaft of the rotation force transfer gear 1550, and its one end is supported in the arc shaped large gear portion 1552 and its other end is supported in the arc shaped small gear portion 1551, whereby an elastic force is provided in an opening direction. Therefore, when the full-ice sensing bar 170 is rotated and descends to sense whether the ice bank 42 has been fully filled with ice pieces, even though the full-ice sensing bar 170 is not rotated any more due to the ice pieces fully filled in the ice bank 42, the third elastic member 1558 may be rotated at a predetermined angle, whereby the gears coupled with each other are not damaged.

The magnet 1564 is fixed to one side of the full-ice sensing bar rotation gear 1560, and a second hall sensor 1566 may be installed at one side below the circuit board 1580. The second hall sensor 1566 may be provided in a protruded shape in view of a relative position with the magnet 1564.

The magnet 1564 is rotated together with the full-ice sensing bar rotation gear 1560 as the full-ice sensing bar rotation gear 1560 is rotated. The magnet 1564 is the closest to the second hall sensor 1566 in a position where the full-ice sensing bar 170 is rotated toward the lowest portion, whereby the second hall sensor 1566 senses a signal at the time when the magnet 1564 is the closest to the second hall sensor 1566. That is, if the second hall sensor 1566 senses that the full-ice sensing bar 170 is upwardly rotated, descends and then is rotated toward the lowest position, the second hall sensor 1566 may sense that the ice bank 42 cannot be fully filled with ice pieces.

In some implementations, the circuit board 1580 is connected with a switch 1505 provided inside the case 1502 of the driving device 150 and partially protruded to the outside of the case 1502. Also, the circuit board 1580 is connected with the motor 1510 to adjoin the motor 1510, includes the first and second hall sensors 1536 and 1566 installed therein, and is connected with the temperature sensor 182 provided inside the case 1502 by a wire.

The circuit board 1580 performs a test mode in accordance with an action signal of the switch 1505, rotates the motor 1510 in a forward direction or backward direction by operating the motor 1510, and transfers sensing signals of the first and second hall sensors 1536 and 1566 and the temperature sensor 182 to a main controller provided in the refrigerator main body. In some implementations, the circuit board 1580 operates the motor 1510 by receiving an operation command signal from the main controller.

Since the circuit board 1580 does not include a controller for controlling the ice maker 100 unlike the related art, its size may be made with a very small size. Instead, the circuit board 1580 may transfer a sensing signal and a command signal to the main controller, whereby the main controller may control the ice maker 100.

Next, operations of the first rotation member and the second rotation member will be described with reference to FIGS. 7A to 7C, 8A, and 8B.

Figure 7A:
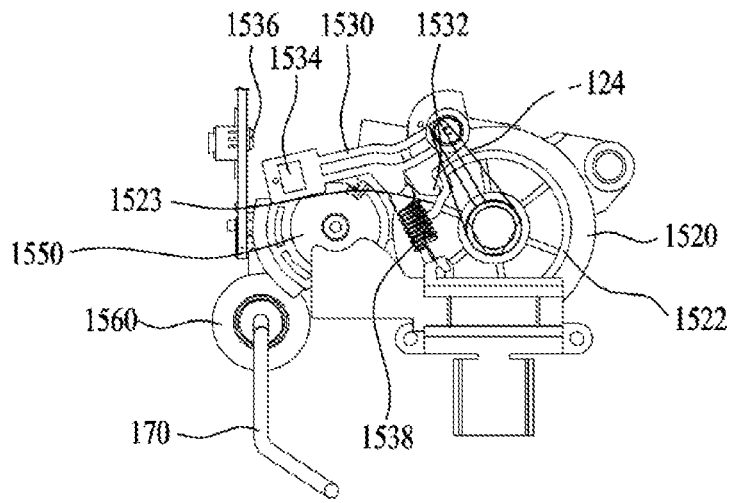
FIGS. 7A to 7C are right side views illustrating example operations of an example first rotation member of FIG. 5.
Figure 7B:
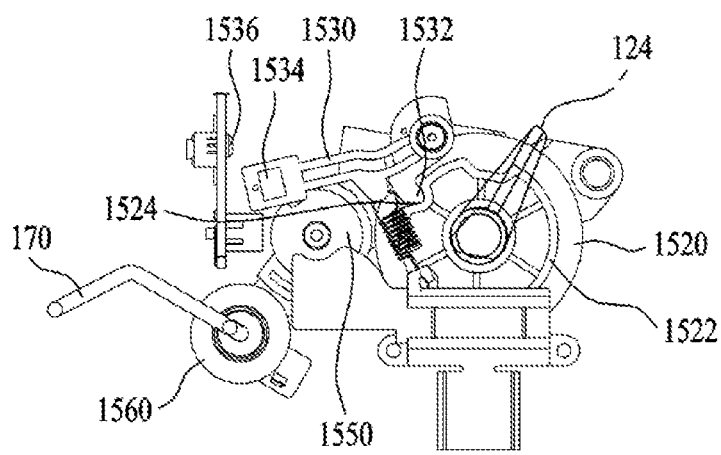
Figure 7C:
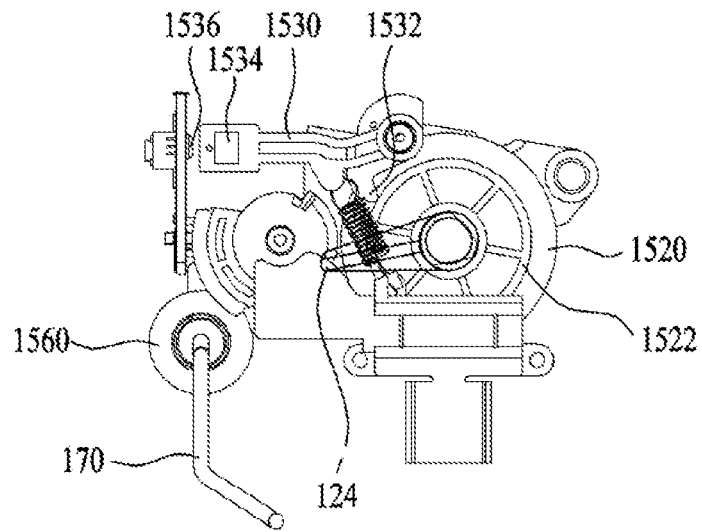

FIGS. 7A to 7C illustrate examples of inner elements of the driving device, wherein an operation state of the first hall sensor unit is viewed from a right side, that is, a side where the ejector exists.

FIG. 7A illustrates a state that the protrusion pins 124 of the ejector 120 are arranged in an initial position (this position is referred to as a "first position"). At this time, since the first protrusion 1532 of the first rotation member 1530 is inserted into the first groove 1523 of the first cam portion 1522, the first rotation member 1530 is pulled by the first elastic member 1538 and downwardly rotated. Since the first hall sensor 1536 is spaced apart from the magnet 1534, the first hall sensor 1536 fails to sense a signal.

FIG. 7B illustrates a state that the protrusion pins 124 of the ejector 120 are upwardly rotated by a reverse rotation of the motor at a predetermined angle for full-ice sensing (this position is referred to as a "second position"). At this time, since the first protrusion 1532 of the first rotation member 1530 is inserted into the second groove 1524 of the first cam portion 1522, the first rotation member 1530 is pulled by the first elastic member 1538 and downwardly rotated. Even at this time, since the first hall sensor 1536 is spaced apart from the magnet 1534, the first hall sensor 1536 fails to sense a signal.

When the first protrusion 1532 passes through the outer circumference between the first groove 1523 and the second groove 1524 of the first cam portion 1522, since the first protrusion 1532 is pushed up by the outer circumference of the first cam portion 1522, the first rotation member 1530 is upwardly rotated in spite of a pulling force of the first elastic member 1538 as shown in FIG. 7C. At this time, since the first hall sensor 1536 is spaced apart from the magnet 1534, the first hall sensor 1536 senses a signal.

That is, the first hall sensor 1536 continuously senses a signal when the first protrusion 1532 passes through the outer circumference not the first and second grooves 1523 and 1524 of the first cam portion 1522, and stops from sensing a signal when the first protrusion 1532 is inserted into the first and second grooves 1523 and 1524 of the first cam portion 1522, whereby the rotation angle position of the ejector 120 may be determined.

In some implementations, if the ejector rotation gear 1520 moves to the position of FIG. 7B, the full-ice sensing bar 170 is rotated to upwardly move in accordance with the operation of the second rotation member 1540 as described later.

In case of the full-ice sensing operation, the ejector rotation gear 1520 is rotated from the initial position of FIG. 7A to the position of FIG. 7B and then rotated to the position of FIG. 7A (rotated clockwise and then rotated counterclockwise). This means that the motor 1510 rotates the ejector rotation gear 1520 at a predetermined angle in a backward direction and then rotates the ejector rotation gear 1520 in a forward direction. Therefore, as the full-ice sensing bar 170 is rotated from the downward position as shown in FIG. 7A to the upward position as shown in FIG. 7B and then descends toward the downward position, the second hall sensor 1566 senses whether the full-ice sensing bar 170 descends as much as possible, as described later.

If the full-ice sensing bar 170 descends to the maximum downward position as shown in FIG. 7A, it may be determined that the ice bank 42 is not fully filled with ice pieces, and if the full-ice sensing bar 170 fails to descend to the maximum downward position due to ice pieces in the middle of descending toward the downward position, it may be determined that the ice bank 42 is fully filled with ice pieces.

If it is determined that the ice bank 42 is not fully filled with ice pieces, the heater 140 is first heated and then the ejector 120 is rotated at 360° in a forward direction (counterclockwise direction). Then, the ice pieces in the ice tray 110 are separated from the ice tray 110 and dropped onto the ice bank 42. A middle state that the ejector 120 is rotated for ice separation is shown in FIG. 7C. At this state, since the magnet 1534 is maintained to be close to the first hall sensor 1536, the state of FIG. 7C is maintained until the first rotation member 1530 is rotated to descend, and the first hall sensor 1536 continues to sense this state.

In this case, when the ejector 120 reaches the second position of FIG. 7B prior to returning to the initial position (the first position), the heated heater 140 is turned off. Since the heater 140 is an electric heating appliance and needs much power consumption, it is possible to reduce power consumption by reducing the heater operation time.

Figure 8A:
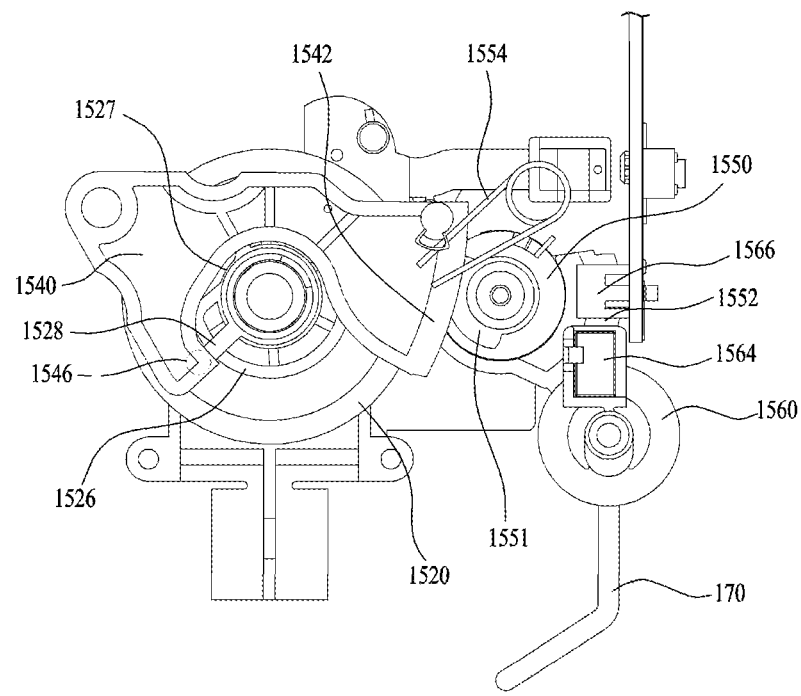
FIGS. 8A and 8B are left side views illustrating example operations of a second rotation member of FIG. 6.
Figure 8B:
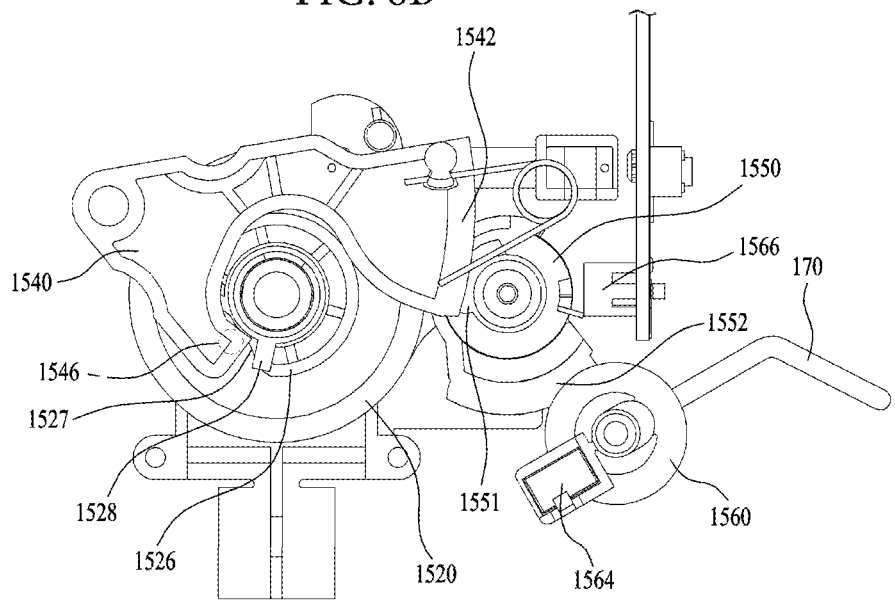

FIGS. 8A and 8B illustrate that the full-ice sensing bar 170 is rotated and the second hall sensor 1566 senses the rotation of the full-ice sensing bar 170 as the second rotation member 1540 is rotated.

FIG. 8A illustrates the state that the second rotation member 1540 is downwardly rotated because the outer circumference of the second cam portion 1526 pushes the second protrusion 1546 when the ejector 120 is in the first position. At this time, since the protrusion 1528 is inserted into a side of one end of the second rotation member, the groove 1527 is hung in the protrusion 1528 even through the groove 1527 reaches the position of the protrusion 1528, whereby the second rotation member 1540 cannot be rotated downwardly.

In this state, the arc shaped large gear portion 1542 formed at the other end of the second rotation member 1540 rotates the rotation force transfer gear 1550 counterclockwise. Therefore, the full-ice sensing bar rotation gear 1560 is rotated clockwise, and thus the full-ice sensing bar 170 descends to the downward position. At this time, since the magnet 1564 is arranged at an opposite side of the full-ice sensing bar 170, the magnet 1564 approaches to the second hall sensor 1566, whereby a sensing signal is generated in the second hall sensor 1566.

FIG. 8B illustrates the state that the ejector 120 is rotated to the second position. At this time, the protrusion 1528 is rotated and come out and at the same time the second cam portion 1526 is also rotated and reaches the position of the second protrusion 1546. Therefore, the second protrusion 1546 is inserted into the groove 1527 of the second cam portion 1526 by an elastic force of the second elastic member 1554, and the second rotation member 1540 is upwardly rotated.

In this state, the arc shaped large gear portion 1542 formed at the other end of the second rotation member 1540 rotates the rotation force transfer gear 1550 clockwise. Therefore, the full-ice sensing bar rotation gear 1560 is rotated counterclockwise, and thus the full-ice sensing bar 170 ascends to the upward position. At this time, since the magnet 1564 arranged at an opposite side of the full-ice sensing bar 170 is far away from the second hall sensor 1566, a sensing signal is stopped in the second hall sensor 1566.

As described above, during full-ice sensing operation, the full-ice sensing bar 170 moves from the position of FIG. 8A to the position of FIG. 8B and then senses full-ice while descending to the position of FIG. 8A.

When the ejector 120 is rotated for ice separation in a forward direction, the ejector rotation gear 1520 is rotated clockwise (counterclockwise based on FIGS. 7A to 7C) in FIGS. 8A and 8B. At this time, since the protrusion 1528 is hung in one end of the second rotation member 1540, the second rotation member 1540 is not rotated, whereby the full-ice sensing bar 170 is maintained at a descending state as shown in FIG. 8A.

Next, a procedure of discharging ice pieces and a control method of an ice maker will be described with reference to FIGS. 9A to 9F.

When the ice maker 100 is initially driven, the rotation angle position of the ejector is identified using the first hall sensor, whereby the ejector 120 reaches the initial position.

Next, water of a predetermined content is supplied to the ice tray 110 and it is in a standby mode for a freezing time when water is frozen by the cool air. At this time, a temperature of the ice tray 110 may be measured through the temperature sensor 182, whereby water has been completely phase-changed to ice pieces.

Next, the full-ice sensing bar 170 is rotated to determine whether the ice bank 42 provided below the ice maker 100 is fully filled with ice pieces. If it is determined that the ice bank 42 is fully filled with ice pieces, it is periodically sensed whether the ice bank 42 is fully filled with ice pieces, and it is in a standby mode in a state that ice separation is stopped until it is determined that the ice bank 42 is not fully filled with ice pieces. To determine full-ice, the ejector is rotated in an opposite direction of the rotation direction of the ejector shown in FIGS. 9A-9F. That is, although the protrusion pins 124 of the ejector are rotated counterclockwise, the protrusion pins 124 are rotated clockwise to sense full-ice.

Next, if it is determined that the ice bank 42 is not fully filled with ice pieces, the heater 140 is heated. The heater 140 is heated for a predetermined time before the ejector starts to be rotated. The heating operation may be performed continuously, may be performed intermittently at a predetermined period, or may be performed at a very short pulse period.

Next, when a predetermined time passes after the heater 140 is heated, or when the temperature of the ice tray 110, which is measured by the temperature sensor, is a predetermined temperature or more, the ejector is rotated in a forward direction (clockwise) to separate ice pieces in the ice tray 110 from the ice tray 110.

At this time, the heater 140 continues to maintain a heating state even after the ejector 120 starts to be rotated, and is turned off before the ejector 120 turns to the initial position. That is, as described above, the first hall sensor 1536 senses that the protrusion pins 124 of the ejector 120 reach the second position and turns off the heater 140 at that time.

When the ejector 120 is rotated for ice separation, since ice pieces are already separated during rotation of 300°, unnecessary operation of the heater may be reduced.

The ejector 120 may be rotated twice not one time during ice separation. The reason why that the ejector 120 is rotated twice is to make sure of complete ice separation in preparation for a case that ice pieces may not be completely separated when the ejector 120 is rotated one time. Also, the ice pieces separated from the ice tray may be hung between the protrusion pins 124 of the ejector 120 when the ejector 120 is rotated one time. As the ejector 120 is rotated twice, the ice pieces separated from the ice tray may make sure of being dropped onto the ice bank 42.

The implementation that the time when ice pieces are generated in the ice tray may be reduced and ice separation may easily be made will be described with reference to FIGS. 10 and 11.

In some implementations, an ice making method includes performing heat absorption through heat transfer by supplying the cool air generated by an evaporator to the ice tray for storing water of the ice maker, performing heat absorption through heat transfer between the ice tray and water, and making ice pieces by reducing a temperature of water to a temperature of a freezing point or less. At this time, ice making performance of the refrigerator is determined by a speed of water received in the ice tray 110, which is reduced to a certain temperature of a freezing point or less, and is improved if efficiency of the heat transfer is increased. Therefore, this implementation is focused on increase of efficiency of heat transfer Qice between water and the cool air generated from the evaporator.

A method for increasing a contact electric heating area to increase heat transfer Qice is applied to this implementation.

In some implementations, a protrusion portion 400 provided to be protruded toward an inner space and longitudinally extended along a rotation direction of the ice pieces is provided in a cell which is one space partitioned by the partition rib 112. FIG. 10 is a view illustrating a side cross-section of a cell, and FIG. 11 is a view illustrating a front cross-section of the ice tray.

Since the protrusion portion 400 is protruded toward an inner side of the cell, an inner area of the cell, which may be in contact with water, is increased. Therefore, the cool air supplied to the ice tray 110 may quickly be transferred to water through heat transfer with water received in the cell, and a generating speed of ice pieces may be improved.

Figure 10:
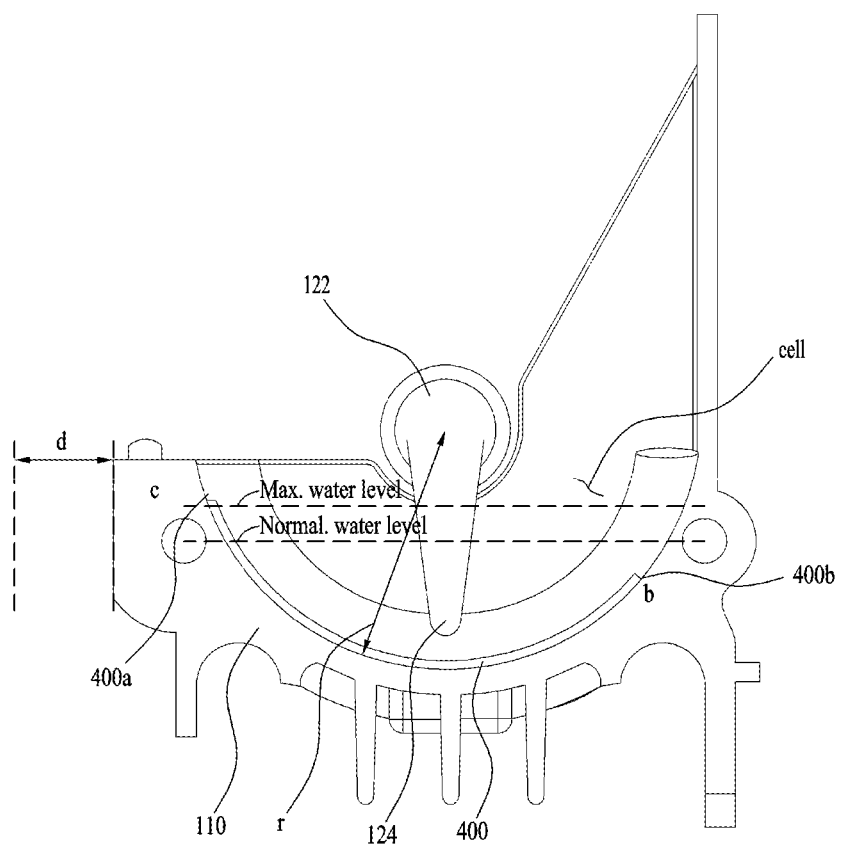
FIG. 10 is a view illustrating an example of a side cross-section of one ice making space.

In FIG. 10, ice pieces made by the ice tray 110 are rotated to draw an arc from a direction 'c' to a direction 'b' by means of the protrusion pin 124 of the ejector 1200 rotated counterclockwise, whereby the ice pieces are dropped onto the lower end of the ice tray 110 through a space 'd'. Therefore, the protrusion portion 400 for increase of the electric heating area has a vertical cross-section to be matched with the rotation direction of the ice pieces for a certain interval.

Also, since the protrusion portion 400 is protruded toward the inner side of the ice making space of the ice tray 110, a water level of water supplied to the ice tray is increased as much as a volume of the protrusion portion 400, whereby the volume of the protrusion portion 400 may be restricted such that a distance between the increased water level and the rotary shaft 122 is not shorter than a certain distance.

Also, a shape of the protrusion portion 400 becomes smaller in the portion 'b' of the ice than the portion 'c' of the ice, and a center of gravity may be given to a moving direction of the ice pieces until the ice pieces are dropped onto portion 'd', whereby the ice pieces may be guided to be normally dropped. In some examples, a height of the protrusion portion 400 may be maintained such that the portion 'c' is higher than a normal water supply level and the portion 'b' is lower than the normal water supply level. At this time, the portion 'c' may be higher than a maximum water level such that the protrusion portion 400 may not act as a resistance when the ice pieces move for ice separation.

In some implementations, the one cell is formed as a space having a certain radius with respect to the rotation direction of the ice pieces. The protrusion pin 124 guides the ice made in the one cell to be pushed counterclockwise and discharged from the ice tray 110. Since the protrusion pin 124 is a member having a certain size, the protrusion pin 124 uniformly pushes the ice even though the rotation position is varied in the cell. Therefore, if a radius in the cell is varied depending on the rotation angle of the protrusion pin 124, a force of the protrusion pin 124, which is applied to the ice, may be varied, whereby various difficulties may occur when the ice pieces are discharged from the ice tray 110.

In some implementations, since the cell is formed to have a certain radius therein, the force of the protrusion pin 124, which is applied to the ice, may be maintained uniformly, whereby reliability in ice discharge may be improved.

Figure 11:
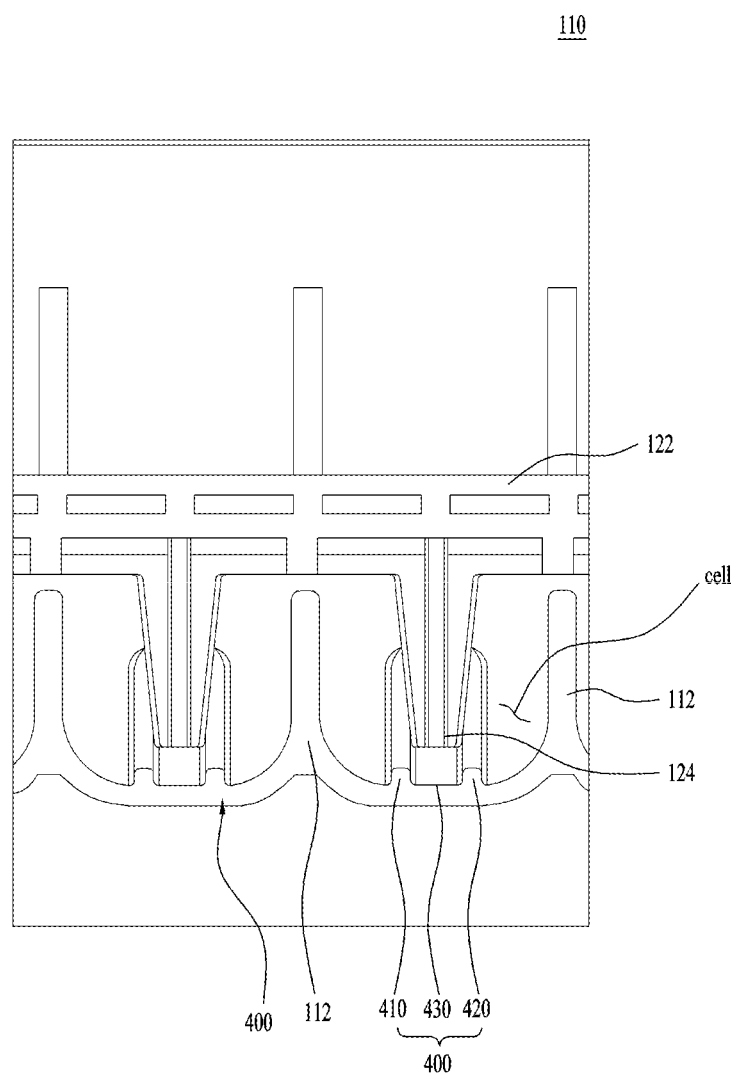
FIG. 11 is a view illustrating an example of a front cross-section in FIG. 10.

Referring to FIG. 11, the protrusion portion 400 includes a first protrusion 410 and a second protrusion 420, which are spaced apart from each other at a certain interval. A recess 430, which is recessed relative to the protrusion portions 410 and 420, is defined between the first protrusion 410 and the second protrusion 420. In some examples, the recess 430 may not be more recessed than the other portion of the bottom surface of the cell. That is, the recess 430 may be arranged to have a height lower than that of the upper end of the protrusion portion 400.

The distance between the first protrusion 410 and the second protrusion 420 may be greater than the width of the protrusion pin 124. If the protrusion pin 124 is rotated to rotate the ice, the protrusion pin 124 passes between the first protrusion 410 and the second protrusion 420. To increase a contact area of the protrusion pin 124 with the ice when the protrusion pin 124 moves the ice in contact with the ice, one end of the protrusion pin 124 may be downwardly extended to a height lower than the upper end of the protrusion portion 400. In this case, if the protrusion portion 400 interrupts movement of the protrusion pin 124, the ice cannot be discharged smoothly. In some examples, the protrusion pin 124 may not be in contact with the protrusion portion 400.

One end of the protrusion pin 124 is extended to be arranged between the protruded height of the protrusion portion 400 and the bottom surface of the cell. That is, one end of the protrusion pin 124 is extended to be arranged between the upper end of the protrusion portion 400 and the bottom surface of the recess 430.

In the protrusion pin 124, a portion close to the rotary shaft 122 has a relatively wide width, whereas a portion far away from the rotary shaft 122 may have a relatively narrow width. Therefore, when the protrusion pin 124 pushes the ice, the protrusion pin 124 may stably transfer the rotation force of the ejector to the ice.

Referring to FIG. 10, the protrusion portion 400 may have an arc shape along an inner shape of the cell. That is, the protrusion portion 400 may be formed to make an arc along the bottom surface of the cell.

Extended heights at both ends of the protrusion portion 400 in the cell may be different from each other. That is, the protrusion portion 400 is arranged such that an angle of a start position based on a circle is asymmetrical to an angle of an end position based on the circle.

One end 400*a* of the protrusion portion 400 may be extended to be higher than the maximum water level of water supplied to the cell. A water supply valve for supplying water to the cell is controlled by a controller such that the amount of water supplied to the cell may not exceed the maximum water level. At this time, the controller may measure the amount of water by means of a flow rate sensor that passes through the water supply valve.

Therefore, one end 400*a* of the protrusion portion 400 is arranged to be higher than the ice frozen in the cell. In this case, the ice may be prevented from failing to move due to the protrusion portion 400 in which the ice is hung when the protrusion pin 124 rotates the ice in contact with the ice in an area adjacent to 'c' to move the ice. That is, since the ice of a portion adjacent to 'c' is frozen while having the shape of the protrusion portion 400, the ice is not hung in the protrusion portion 400.

In some implementations, the portion 'c' means a portion where the protrusion pin 124 starts to be rotated in contact with the ice to discharge the ice from the ice tray 110. In FIG. 10, the protrusion pin 124 is rotated counterclockwise to discharge the ice.

The other end 400*b* of the protrusion portion 400 may be extended to be lower than the maximum water level of water supplied to the cell. That is, the other end 400*b* of the protrusion portion 400 is extended to a height lower than one end 400*a* of the protrusion portion 400.

In some implementations, the other end 400*b* of the protrusion portion 400 may be extended to be lower than the normal water level of water supplied to the cell. That is, the other end 400*b* of the protrusion portion 400 is extended to a height lower than one end 400*a* of the protrusion portion 400.

In the portion adjacent to 'b', the protrusion portion 400 is extended to a height lower than the portion adjacent to 'c'. At this time, the portion adjacent to 'b' means an opposite portion of a portion where the protrusion pin 124 starts to be rotated in contact with the ice to discharge the ice from the ice tray 110.

When the protrusion pin 124 pushes the ice and then reaches the position of 'b' based on FIG. 10, the ice may be discharged to the portion 'd' by self-load after ascending to the upper side of the discharge guide 126 (see FIGS. 3 and 9A-9F). In some examples, the discharge guide 126 may have one side inclined to discharge the ice, and a center of gravity of the ice may be arranged in an inclined direction to smoothly discharge the ice.

In some implementations, since the portion adjacent to 'c' is a portion positioned at the front of rotation and movement of the ice, a volume occupied by the protrusion portion 400 in the cell is reduced, and a volume occupied by water is increased. Therefore, the volume of the ice is more increased in the portion adjacent to 'c' in the cell than the portion adjacent to 'b', and the center of gravity of the ice when the ice moves is arranged in the portion where water is frozen in the portion adjacent to 'c'. Therefore, since the ice may easily move through the discharge guide 126, reliability of ice discharge may be improved.

In some implementations, the upper end of the protrusion portion 400 may be formed to be rounded to constitute a curve. Since the portion where the ice tray 110 is in contact with the ice is formed to be rounded, friction that may occur when the ice moves from the ice tray may be reduced.

Figure 12:
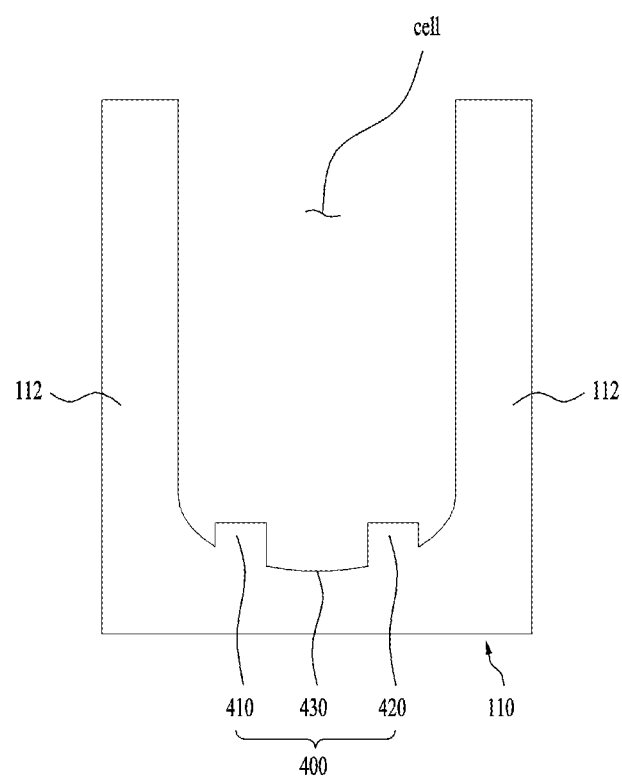
FIGS. 12 and 13 are views illustrating another example of FIG. 11.
Figure 13:
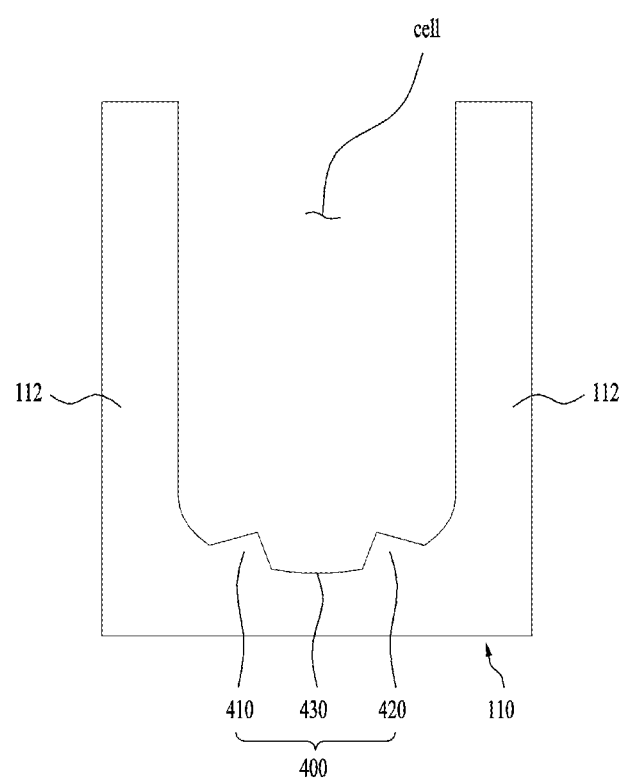

FIGS. 12 and 13 are views illustrating another example of FIG. 11.

As shown in FIG. 12, the upper end of the protrusion portion 400 may be formed to be angulated. Also, as shown in FIG. 13, the upper end of the protrusion portion 400 may be formed to constitute a flat surface. The protrusion portion 400 may be formed in a shape that may be protruded into the cell to increase a contact area with water. In some implementations, the protrusion portion 400 is formed in a shape that does not increase resistance greatly when the ice moves inside the cell.

Figure 14:
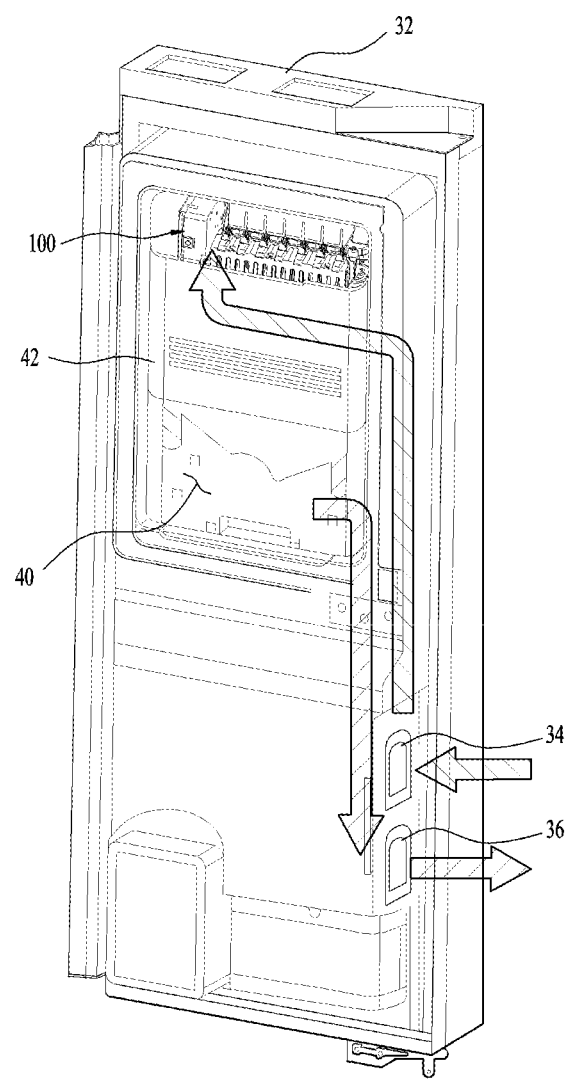
FIG. 14 is a view illustrating an example of a door including an ice maker.
Figure 15:
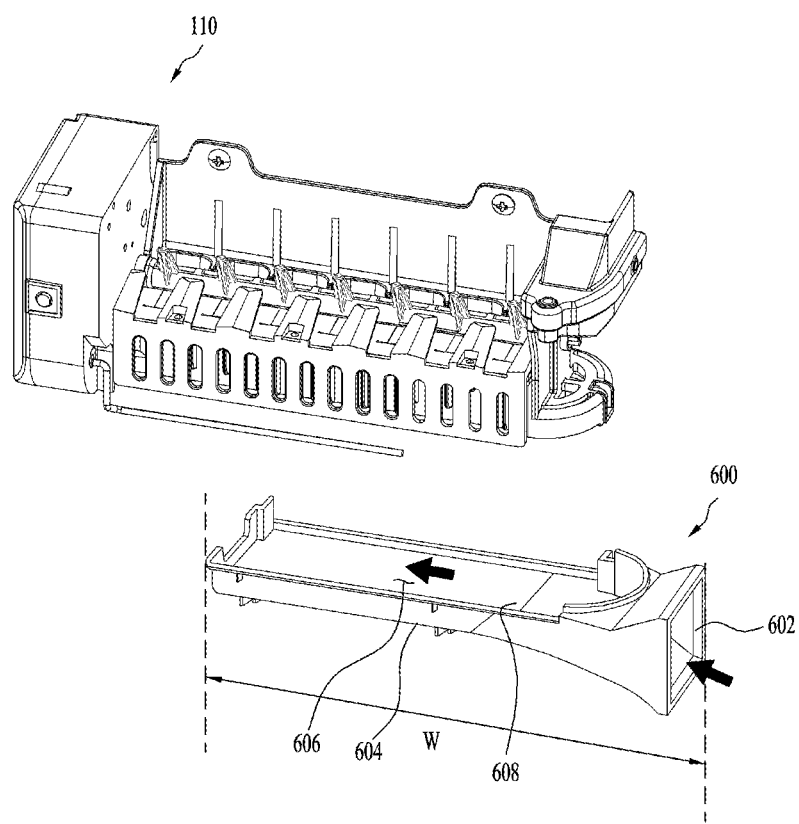
FIG. 15 is a view illustrating portions of the example ice maker of FIG. 14.

FIG. 14 is a view illustrating an example of a door provided with an ice maker, and FIG. 15 is a view illustrating an example portion in FIG. 14.

The ice making compartment 40, which may form ice to provide a user with the ice, is provided inside the refrigerating compartment door 32.

The ice maker 100, which may form ice, is provided at the upper side of the ice making compartment 40, and the ice bank 42, in which the ice pieces discharged from the ice maker 100 are received, is provided at the lower portion of the ice maker 100.

In some implementations, an inlet 34 to which the cool air from the evaporator provided in the cabinet of the refrigerator is transferred is formed at one side of the refrigerating compartment door 32. If the inlet 34 is in contact with a cool air discharge outlet provided in the cabinet, the cool air supplied from the cabinet may be supplied to the inlet 34.

The cool air supplied through the inlet 34 may be supplied to the ice maker 100 and cool the water received in the ice tray 110 after passing through a cool air supply duct provided in the refrigerator compartment door 32.

In some implementations, the cool air discharged from the ice maker 100 is guided to a discharge outlet 36 after passing through the ice bank 42 and then passing through a cool air discharge duct provided in the refrigerating compartment door 32. Since the air discharged from the discharge outlet 36 is in contact with a cool air collecting hole provided in the cabinet, the air may again be guided to the evaporator provided in the cabinet.

Although the ice making compartment 40 needs a temperature below zero to form ice, since the refrigerating compartment door 32 opens or closes the refrigerating compartment which maintains a temperature above zero, the air supplied to the ice making compartment 40 or discharged from the ice making compartment 40 may be not discharged to the refrigerating compartment.

In some implementations, a path that may move through the inlet 34 and the discharge outlet 36 is formed such that the cool air supplied to the refrigerating compartment door 32 and the cool air discharged from the refrigerating compartment door 32 may not leak to the storage compartment.

In some implementations, the cool air supplied to the refrigerating compartment door 32 through the inlet 34 is guided to the upper side of the refrigerating compartment door 32. On the other hand, the cool air which has passed through the ice maker 100 is guided from the inside of the refrigerating compartment door 32 to the lower side of the refrigerating compartment door 32, whereby the cool air may be discharged through the discharge outlet 36.

As shown in FIG. 15, a cool air guide 600 for supplying the cool air to the lower portion of the ice maker 100 is provided at the lower portion of the ice maker 100. An inlet 602 to which the cool air from the cool air supply duct provided inside the refrigerating compartment door 32 is transferred is provided at one side of the cool air guide 600.

The cool air guide 600 is provided with a body 604 for guiding a path of the cool air, and the inlet 602 is arranged at the right side (based on FIG. 15) of the body 604 and thus the cool air is guided from the body 604 in a left direction.

The body 604 includes a bottom surface 608, of which upper side is provided with an opening portion 606, whereby the cool air may upwardly be discharged toward the opening portion 606 without moving to the lower portion of the body 604.

The bottom surface 608 is extended to be shorter than the width of the ice maker 100. The cool air guided through the cool air guide 600 moves to the portion where the bottom surface 608 is formed, relatively stably in a left direction. However, if the cool air gets out of the portion where the bottom surface 608 is formed, the cool air moves relatively freely. Therefore, the cool air moves at a portion where the cool air gets out of the bottom surface 608, in various directions, whereby the cool air may get out of resistance from the bottom surface 608.

Figure 16:
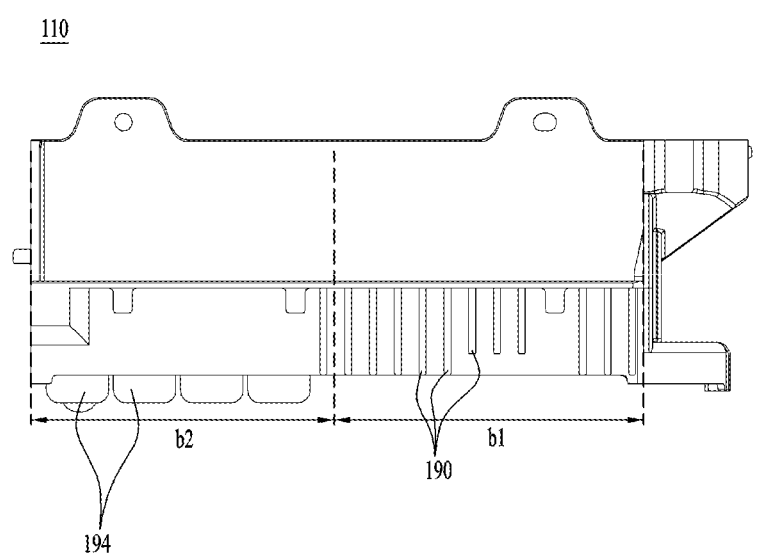
FIG. 16 is a view illustrating an example ice tray viewed from a front side.
Figure 17:
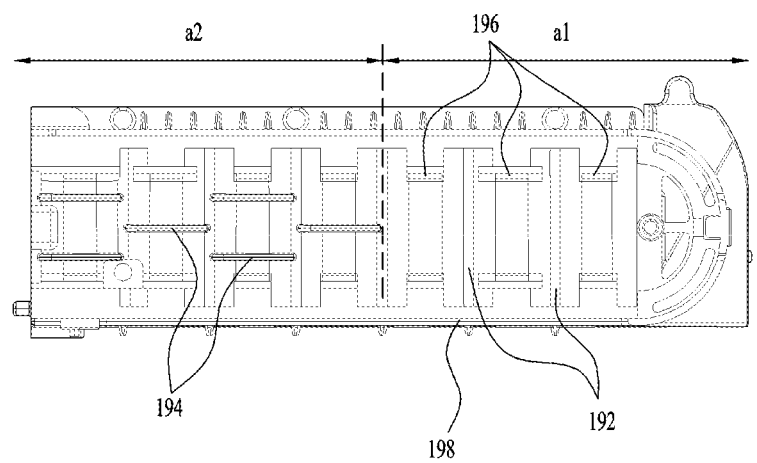
FIG. 17 is a view illustrating a lower portion of an example ice tray.
Figure 18:
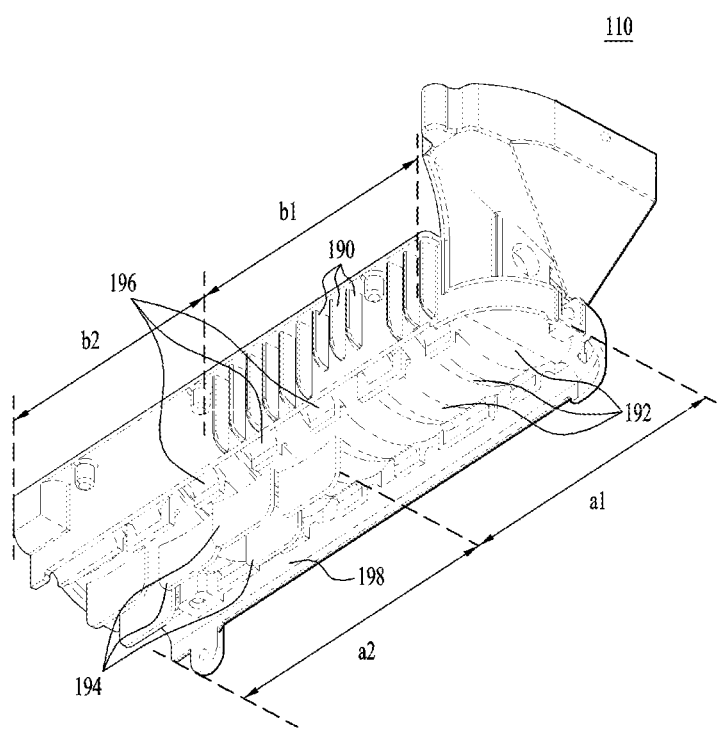
FIG. 18 is a view illustrating a lower side of an example ice tray.

FIG. 16 is a view illustrating an example ice tray viewed from the front, FIG. 17 is a view illustrating a lower portion of an example ice tray, and FIG. 18 is a view illustrating an example ice tray viewed from a lower side.

In FIGS. 16 and 17, arrows represent a brief moving direction of the cool air supplied form the cool air guide 600.

When the ice tray 110 is heated for ice separation, pins of the ice tray 110 are excessively increased, an electric heating area is increased, and a heating time is increased due to increase of heat capacity of the ice tray 110. This may cause reduction of ice making amount, increase of ice making power consumption, and quality deterioration of ice pieces due to melting of ice caused by heating of the heater. That is, since a heat transfer coefficient 'ha' for increase of ice making heat transfer amount is increased if a pressure drop amount on a cool air path is small, reckless pin attachment of the ice tray 110 may cause reduction of ice making air volume.

In some implementations, a method for discharging the cool air to a front surface of the ice tray 110 by allowing the cool air to enter a right side of the ice maker 100 and performing heat transfer from lower and front surfaces of the ice tray 110 is adopted. To increase ice making performance (ice making heat transfer amount) in the ice maker, pins are arranged for an electric heating area of the ice tray 110 and the cool air. However, if the pins are excessively arranged for increase of the electric heating area, a heating time for ice separation is increased due to increase of heat capacity according to increase of a total mass of the ice tray 110, whereby ice making heat transfer efficiency is reduced. Also, a pressure drop amount of an ice making path is increased in accordance with arrangement of the pins, whereby heat transfer efficiency may be reduced. Therefore, in this implementation, the technology of lower and front surfaces of the ice tray has been devised considering the aforementioned technical restrictions.

In some implementations, the cool air for ice making may enter the ice tray 110 from the left side, cool the lower end of the ice tray 110, and then discharge to the front surface of the ice tray 110. At this time, since the driving device 150 for rotation of the ejector 120 exists at the left side of the ice tray, the path is blocked, whereby vortex occurs at the lower end of the ice tray 110. Therefore, to minimize the vortex, the pins are removed from a certain area of the front surface, whereby efficiency in trade-off between the electric heating area and pressure drop is increased.

In case of the lower end of the ice tray 110, a lot of heat transfer of the cool air occurs at the right side of the ice tray 110, the right side of the ice tray 110 has the lowest temperature, whereas heat transfer is reduced at the left side of the ice tray 110 due to flow speed reduction and air temperature increase. Therefore, it is effective to arrange lower pins of the ice tray 110 at only a certain area. Also, staggered arrangement not in-line arrangement is applied to arrangement of the pins.

A first guide rib 192, for heat exchange with the cool air supplied from the cool air guide 600, a second guide rib 194 and a third guide rib 196 are arranged at the lower portion of the ice tray 110.

The first guide rib 192 extends in a forward and backward direction with respect to the ice tray 110 and thus arranged to be vertical to the cool air supplied from the cool air guide 600 in a left direction. Also, the first guide rib 192 is downwardly protruded with respect to the ice tray 110, whereby a contact area of the ice tray 110 with the cool air may be increased through the first guide rib 192 to quickly generate ice pieces.

The second guide rib 194 extends in a left and right direction with respect to the ice tray 110 and thus arranged to be parallel with the cool air supplied from the cool air guide 600 in a left and right direction. Also, the second guide rib 194 is downwardly protruded with respect to the ice tray 110, whereby the contact area of the ice tray 110 with the cool air may be increased through the second guide rib 194 to quickly generate ice pieces.

In some implementations, the second guide rib 194 may be arranged at the center of the lower portion of the ice tray 110 to guide a moving direction of the cool air supplied from the cool air guide 600.

In some implementations, the lower portion of the ice tray 110 may be categorized into a first area a1 arranged to adjoin the cool air guide 600 and a second area a2 arranged to be far away from the cool air guide 600.

Since the first area a1 is arranged to be close to the cool air guide 600, the first area a1 is a portion where a relatively fast speed of the cool air supplied from the cool air guide 600 is maintained. On the other hand, since the second area a2 is arranged to be far away from the cool air guide 600, the second area a2 is a portion where the speed of the cool air supplied from the cool air guide 600 relatively becomes slow. If there are a lot of projected portions in the ice tray 110, since the contact area of the ice tray 110 with the cool air is increased, it is advantageous in that heat exchange efficiency is increased, whereas a drawback occurs in that friction with the air is increased to make the moving speed of the air slow.

Therefore, in the area of a1, the second guide rib 194 is not provided, and the cool air is maintained at a relatively fast speed to easily move the cool air to the area of a2. On the other hand, since the speed of the cool air is lowered in the area of a2, the second guide rib 194 is provided to have more contact areas.

In some implementations, the second guide rib 194 is arranged to be parallel with a left direction, to which the cool air moves, such that the moving speed of the cool air does not become slow if possible.

The third guide rib 196 extends in a left and right direction with respect to the ice tray 110 and arranged at lower corners of the ice tray 110. The third guide rib 196 may form a lower outside of the ice tray 110.

At this time, a barrier 198 is provided at the rear of the ice tray 110. The barrier 198 may be spaced apart from the third guide rib 196.

The heater 140 may be arranged between the barrier 198 and the third guide rib 196.

The third guide rib 196 guides the cool air to stay in the lower portion of the ice tray 110, whereby a heat exchange time of the cool air with the ice tray 110 may be increased.

The third guide rib 196 may be arranged at both ends of the first guide rib 192. That is, the third guide rib 196 may be arranged at a portion where the first guide rib 192 ends.

Each of the first guide rib 192 and the third guide rib 196 may be arranged as a plurality of the same. The third guide ribs 196 may be arranged to connect the first guide ribs 192 in a line. Therefore, the time when the cool air stays in the lower portion of the ice tray 110 is increased, whereby ice making efficiency may be improved.

The respective third guide ribs 196 may be spaced apart from each other in a left and right direction. Since the portion where the heater 140 is arranged may partially be exposed between the third guide ribs 196, the heater 140 may be cooled together with the third guide ribs 196.

The plurality of first guide ribs 192 may be arranged, and the respective first guide ribs 192 may be arranged at the same interval. At this time, the second guide rib 194 may be arranged to connect two of the first guide ribs 192 to guide a flow of the cool air.

Particularly, the second guide rib 194 may be formed to be more protruded downwardly than the first guide rib 192, and thus may guide the cool air in a certain direction while increasing the contact area with the cool air.

The second guide rib 194 may be arranged as a plurality of the same, and the respective second guide ribs 194 may be arranged alternately. Since the second guide ribs 194 are formed to be more protruded downwardly than the first guide rib 192, it may be difficult for the cool air to move in a forward and backward direction between the second guide ribs 194. Therefore, to enhance freedom of degree in the moving direction of the cool air, the second guide ribs 194 are arranged in staggered arrangement not in-line arrangement.

Fourth guide ribs 190 are provided on a front surface (see FIG. 16) of the ice tray 110 and protruded to be extended in an up and down direction. The fourth guide ribs 190 are arranged in a third area b1 arranged to adjoin the cool air guide 600 in the ice tray 110.

On the other hand, on the front surface of the ice tray 110, a fourth area b2 arranged to be far away from the cool air guide 600 may have a flat shape. That is, since the fourth guide ribs 190 are not arranged in the fourth area b2, the fourth area b2 may constitute one surface.

The moving speed of the cool air is relatively fast in the third area b1 adjacent to the cool air guide 600 on the front surface of the ice tray 110, whereas the moving speed of the cool air becomes slow in the fourth area b2 far away from the cool air guide 600.

Therefore, the fourth guide ribs 190 are provided in the third area b1 to increase a heat exchange area with the cool air. On the other hand, the fourth area b2 may be formed as a flat surface, whereby the cool air may pass through the fourth area b2 without any delay.

In some implementations, since some of the fourth guide ribs 190 are extended at different lengths to guide the cool air in various directions not a uniform direction.

The portion where the first area a1 and the second area a2 are divided from each other may be the same as or different from the portion where the third area b1 and the fourth area b2 are divided from each other.

The cool air guide 600 is arranged below the ice tray 110, and the air guide 166 is arranged on the front surface of the ice tray 110 (see FIGS. 2 and 3). Although the air guide 166 is provided with the cool air discharge holes 169, the space between the ice tray 110 and the air guide 166 is smaller than the lower space of the ice tray 110. Therefore, based on that it is more difficult for the cool air to move on the front surface of the ice tray 110 than the lower portion of the ice tray 110, less guide ribs are arranged on the front surface than the lower portion to improve heat exchange efficiency between the cool air and the ice tray.

Figure 19:
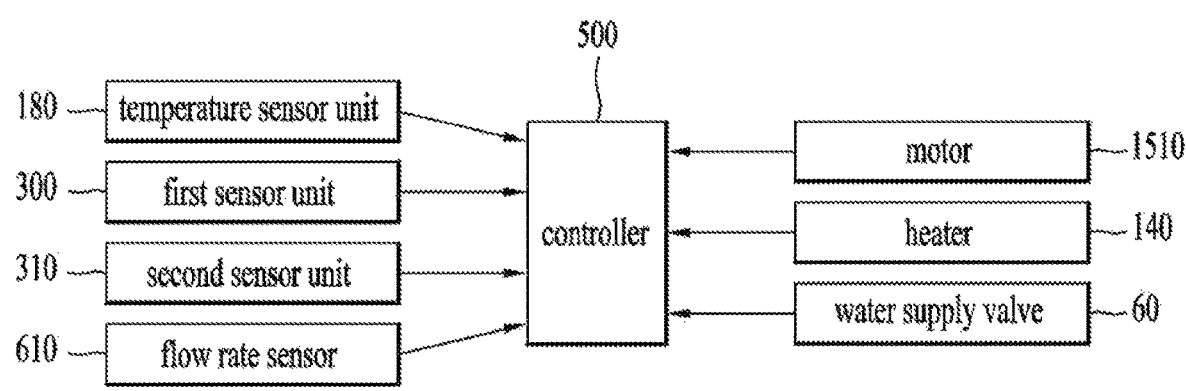
FIG. 19 is a control block diagram illustrating example components of an example refrigerator.

FIG. 19 is a control block diagram illustrating one implementation. Description will be given with reference to FIG. 19.

In the present disclosure, a controller 500 receives information from various elements and transfers a related command in accordance with the received information. The controller 500 may be provided in the circuit board 1580 of the ice maker 100.

Unlike the above case, to concisely maintain the circuit board 1580, the controller may mean a controller for controlling the refrigerator. In this case, the controller 500 may together perform a function of driving a compressor for compressing a refrigerant, a function of transferring a related signal to a display provided in a door, and a function of transmitting and receiving a signal between an external communication network and the refrigerator.

Description will be given based on that the present disclosure is applicable to both the aforementioned two examples (the example that the controller is provided in the circuit board and the example that the controller corresponds to a main controller of the refrigerator).

The controller 500 receives information on a temperature from the temperature sensor unit 180. The controller 500 may determine whether the ice tray 110 has been sufficiently cooled, and may determine whether ice has been formed in the ice tray 110 in accordance with the sensed temperature.

The first sensor unit 300 may sense movement of the first rotation member in accordance with rotation of the ejector rotation gear. To this end, the first sensor unit 300 may include a first hall sensor 1536 as shown in FIGS. 7A to 7C. The first hall sensor 1536 may sense a change of a magnetic force if the first rotation member moves, and therefore may sense rotation of the ejector. Therefore, the controller 500 may sense a rotation angle of the ejector 120 by means of the first sensor unit 300.

The second sensor unit 310 may sense movement of the second rotation member in accordance with rotation of the ejector rotation gear. To this end, the second sensor unit 310 may include a second hall sensor 1566 as shown in FIGS. 8A and 8B. The second hall sensor 1566 may sense a change of a magnetic force if the full-ice sensing bar rotation gear 1560 moves together with the second rotation member, and therefore may sense rotation of the full-ice sensing bar rotation gear 1560. Therefore, the controller 500 may sense whether ice pieces are stacked at a set amount or more, by means of the second sensor unit 310.

A flow rate sensor 610 may sense the amount of water supplied to the ice tray 110. Therefore, the controller 500 may sense the amount of water supplied to the ice tray 110 in accordance with a signal received from the flow rate sensor 610.

The controller 500 may command the motor 1510 to perform a forward rotation or backward rotation. That is, the motor 1510 may rotate the ejector rotation gear clockwise or counterclockwise in accordance with the signal of the controller 500.

The controller 500 may turn on or off the heater 140. The controller 500 may heat the ice tray 110 by turning on the heater 140 in accordance with the rotation angle of the ejector. Also, the controller 500 may stop supply of heat to the ice tray 110 by turning off the heater 140 in accordance with the rotation angle of the ejector.

The controller 500 may open or close the water supply valve 60 for opening or closing the path where water is supplied to the ice tray 110 in accordance with flow rate information received from the flow rate sensor 610. If the water supply valve 60 opens the path, water may be supplied to the ice tray 110, and if the water supply valve closes the path, water is not supplied to the ice tray 110.

Figure 20A:
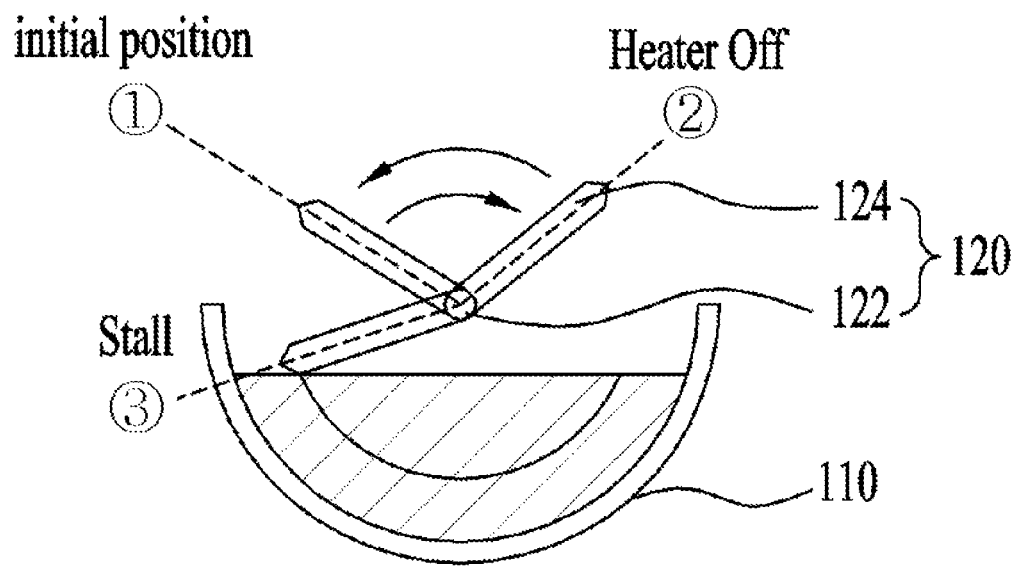
FIGS. 20A and 20B are views illustrating an example of a rotation path of an example ejector.
Figure 20B:
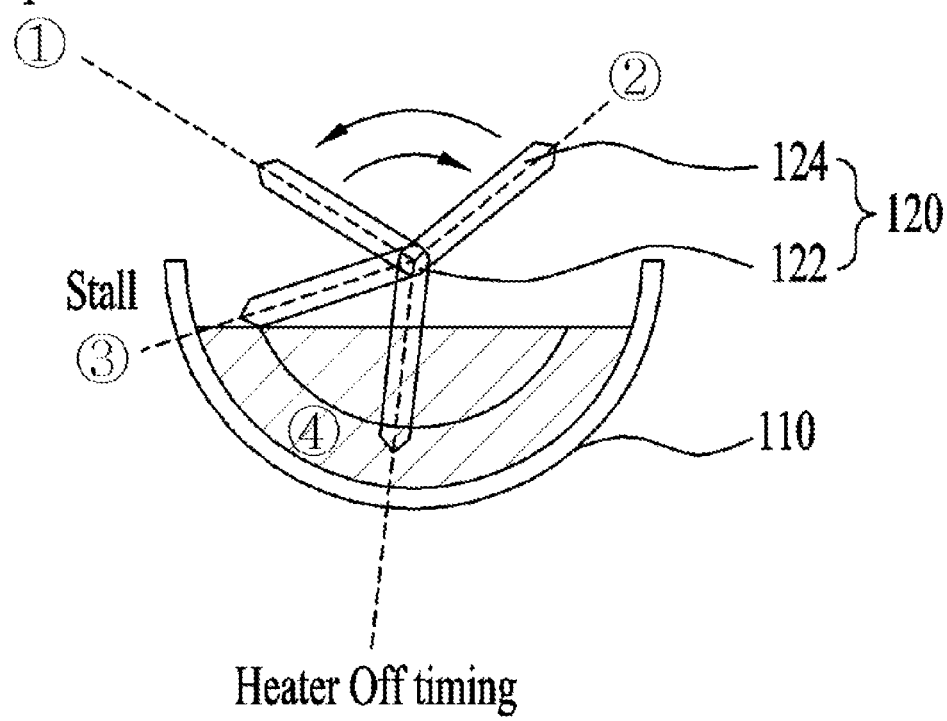
Figure 21A:
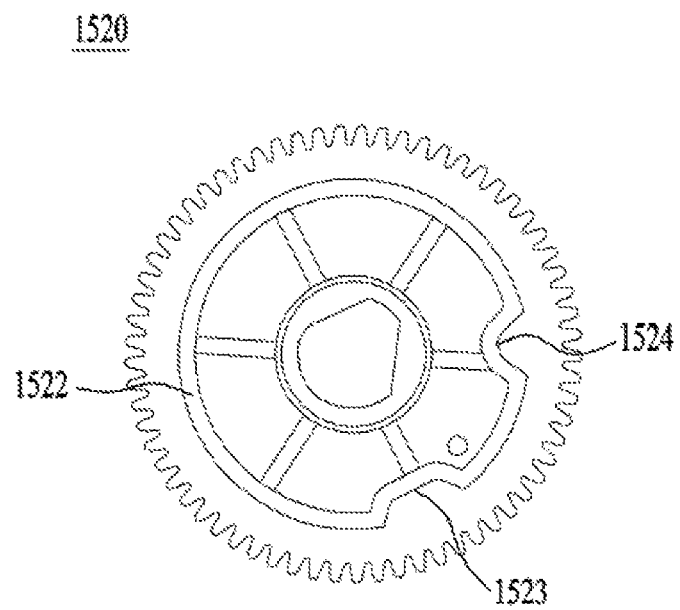
FIGS. 21A and 21B are views illustrating an example of an ejector rotation gear.

FIGS. 20A and 20B are views illustrating an example of a rotation path of an example ejector, and FIGS. 21A and 20B are views illustrating an example of an ejector rotation gear.

FIG. 20A illustrates that an implementation described with reference to FIGS. 4 to 8B is implemented, and FIG. 20B illustrates a method implemented in accordance with another implementation. Likewise, rotation according to FIG. 20A may be implemented by an operation of the ejector rotation gear shown in FIG. 21A, and rotation according to FIG. 20B may be implemented by the ejector rotation gear shown in FIG. 21B.

The implementation according to FIGS. 20A and 21A will be described. If ice making is completed in the ice tray 110, the ejector 120 is rotated from the first position to the second position counterclockwise to identify full-ice of the ice bank 42. At this time, although the protrusion pin 124 is rotated together with the ejector 120, the full-ice sensing bar rotation gear 1560 is substantially rotated to sense full-ice.

In this case, as the ejector rotation gear 1520 shown in FIG. 21A is rotated clockwise, and the first rotation member 1530 is hung in the second groove 1524. Therefore, the first sensor unit 300 may sense movement of the first rotation member 1530, and may finally sense that the protrusion pin 124 moves to the second position.

Subsequently, the controller 500 provides a rotation force of the motor 1510 rotated counterclockwise, whereby the ejector 120 is rotated counterclockwise. That is, the protrusion pin 124 moves from the second position to the first position. Likewise, since the first rotation member 1530 is hung in the first groove 1523, the first sensor unit 300 may sense movement of the first rotation member 1530, and may finally sense that the protrusion pin 124 moves to the first position. The first position may mean the initial position.

At the first position, if a certain time passes after the heater 140 is turned on, the protrusion pin 124 moves to the third position counterclockwise due to the rotation force of the motor 1510. The protrusion pin 124 continues to push the ice until the surface of the ice is melted and then the ice moves. If the surface of the ice is melted and the ice moves after a certain time passes, the protrusion pin 124 moves by continuously pushing the ice. Even at this time, the heater 140 is continuously driven, and heats the ice tray 110. If the heater 140 is driven, since a current is supplied to the heater 140, the heater 140 consumes energy.

If the protrusion pin 124 pushes the ice while being rotated counterclockwise and finally reach the second position, the heater 140 is turned off. That is, no current is supplied to the heater 140, and energy consumption is stopped.

Subsequently, if the protrusion pin 124 reaches the first position while being rotated counterclockwise, it is determined that ice separation of the ice tray 110 is completed.

Figure 21B:
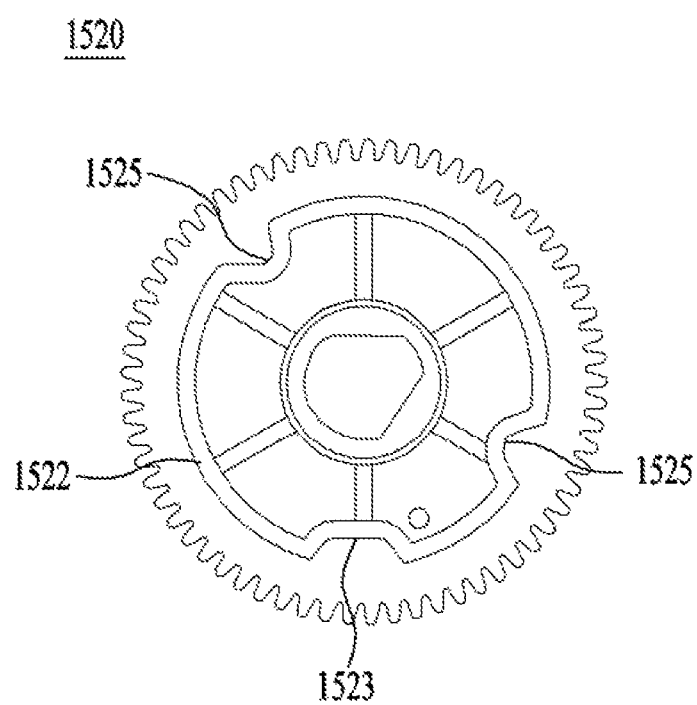

Unlike the implementation according to FIGS. 20A and 21A, the first cam portion 1522 of the ejector rotation gear is additionally provided with a third groove 1525 in the implementation according to FIGS. 20B and 21B. That is, the first cam portion 1522 are provided with the first groove 1523, the second groove 1524 and the third groove 1525.

If the first rotation member 1530 is hung in each of the first, second and third grooves 1523, 1524 and 1525, the first sensor unit 300 senses a position change of the first rotation member 1530. Therefore, the first sensor unit 300 may sense how the ejector 120, that is, the protrusion pin 124 is rotated to reach the current position and an angle at the current position.

In some implementations, the ejector rotation gear 1520 is rotated from the first position to the second position in the same manner as the implementation of FIGS. 20A and 21A to sense full-ice. Therefore, the protrusion pin is rotated from the first position to the second position clockwise.

If the ice pieces are stacked in the ice bank 42 at a height lower than the set height, the ejector 120 is rotated counterclockwise. The protrusion pin 124 moves from the second position to the first position, and continue to be rotated counterclockwise and then move to the third position.

At this time, the first sensor unit 300 senses the time when the first rotation member 1530 is hung in the first groove 1523 (when the first rotation member 1530 reaches the first position), whereby the heater 140 is turned on at the corresponding time.

If the protrusion pin 124 is rotated counterclockwise to reach the third position and continuously push the ice, the ice starts to move by means of the protrusion pin 124.

In some implementations, if the protrusion pin 124 continues to be rotated counterclockwise, the ice move and the protrusion pin 124 reaches the fourth position. If the ice moves to the fourth position, the ice is substantially separated from the ice tray 110, whereby the ice may move by means of only the rotation force of the protrusion pin 124 even though heat is not supplied from the heater 140.

The time when the protrusion pin 124 reaches the fourth position is the same as the time when the first rotation member 1530 is hung in the third groove 1525. That is, if the ejector rotation gear 1520 continues to be rotated counterclockwise, the ejector, that is, the protrusion pin 124 is rotated counterclockwise together with the ejector rotation gear 1520. If the first rotation member 1530 is hung in the third groove 1525, the first rotation member 1530 moves, and the first sensor unit 300 may sense the corresponding time.

The controller 500 may determine that the heater 140 does not need to supply heat because the protrusion pin 124 sufficiently pushes the ice at the corresponding time, and may turn off the heater 140, whereby energy may be saved.

In the implementation of FIGS. 20B and 21B, the heater 140 is turned off at an earlier time as compared with the implementation of FIGS. 20A and 21A. That is, power consumption in the heater 140 may be reduced. If the power consumed by the heater 140 is increased, since the ice tray 110 is also heated by a high temperature, more energy is consumed to again cool the ice tray 110 to form the ice.

In the implementation of FIGS. 20B and 21B, energy consumed by the heater and energy consumed to cool the ice tray may be reduced as compared with the implementation of FIGS. 20A and 21A. In the implementation of FIGS. 20B and 21B, since the temperature of the ice tray is not increased as compared with the implementation of FIGS. 20A and 21A, the ice tray may be cooled more quickly. Therefore, since the time required to form the ice may be reduced, the amount of the ice that may be provided to the user may be increased.

In some implementations, a structure that the position (e.g., the position of the protrusion pin 124 between 0° and 90° where the ejector starts to move from the third position may be sensed is applied to the implementation of FIGS. 20B and 21B, and the heater 140 may be turned off relatively quickly.

In some implementations, for ice separation from the ice tray 110, the heater 140 at the lower end of the ice tray 110 may be used. If the protrusion pin 124 starts to move the ice beyond the third position, since the surface of the ice is melted even though the heater 140 is turned off, ice separation may be performed.

Figure 22:
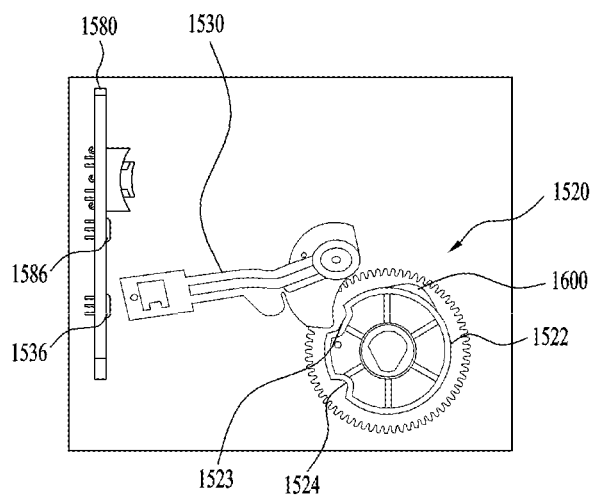
FIG. 22 is a view illustrating another example of an ejector rotation gear.

FIG. 22 is a view illustrating another implementation of an ejector rotation gear.

Referring to FIG. 22, the ejector rotation gear 1520 includes the first groove 1523, the third groove 1524 and a protrusion 1600 on the outer circumference of the first cam portion 1522.

The initial position of the ejector is sensed by movement of the first rotation member 1530, which is generated in the first groove 1523, and a full-ice position is sensed by movement of the first rotation member 1530, which is generated in the second groove 1524.

On the other hand, the time when the heater 140 is turned off is sensed by movement of the first rotation member 1530, which is generated in the protrusion 1600.

If the first rotation member 1530 is hung in the first groove 1523 and the second groove 1524, a position change of the first rotation member 1530 is sensed by the first hall sensor 1536 of the first sensor unit 1586.

The first sensor unit 300 further includes a third hall sensor 1586 packaged in the circuit board 1580. The third hall sensor 1586 is arranged above the first hall sensor 1536.

If the first rotation member 1530 is hung in the protrusion 1600, since the first rotation member ascends, the third hall sensor 1586 may sense movement of the first rotation member 1530.

That is, in this implementation, it is designed such that the protrusion 1600 is added to allow the first rotation member 1530 to ascend. The first sensor unit 300 may sense whether the ejector has reached the initial position, by means of the first hall sensor 1536, and may sense whether the ejector has reached the position where the heater may be turned off, by means of the third hall sensor 1586.

In this implementation, since the first sensor unit includes two hall sensors, a first group of the initial position and the full-ice position may be identified from a second group of a position where the heater may be turned off.

In some implementations, the off-time of the heater 140 may be determined by measurement of the current supplied to the motor 1510. Since the ice does not move initially at the third position corresponding to the time when the protrusion pin 124 is rotated to reach the ice, stall occurs, and a current value supplied to the motor 1510 is increased. If the ice starts to move, stall is released and the protrusion pin 124 is rotated, and a current value consumed by the motor 1510 is reduced. The time when the current consumed by the motor 1510 is determined, and it is determined at that time that ice separation may be performed even though heat is not additionally supplied from the heater, whereby the heater may be turned off.

That is, the first sensor unit 300 may sense the angle of the protrusion pin 124 before the ice formed in the ice tray 110 is completely discharged from the ice tray 110. The first sensor unit 300 may sense whether the ice passes through a specific position of a rotation track of the protrusion pin 124 even before the ice is completely discharged, by sensing whether the protrusion pin 124 have reached a specific angle. In some implementations, the heater 140 may be turned off at the angle sensed by the first sensor unit 300. That is, since the heater 140 may be turned off before the ice is completely discharge from the ice tray 110, energy consumed for driving the ice maker may be saved.

In some implementations, the first sensor unit 300 may sense whether the protrusion pin 124 has reached an angle before the ice ascends to the discharge guide 126, and may turn off the heater 140 at the corresponding angle. After the ice ascends to the discharge guide 126, the ice may be dropped along a slope of the discharge guide 126 and stored in the ice bank 42.

Also, the first sensor unit 300 may sense whether the protrusion pin 124 has reached an angle which has rotated the ice formed by the ice tray at 90° or less, thereby turning off the heater 140 at the corresponding angle. Since the ice moves from the ice tray in a state that the ice is rotated at 90° or less, the ice may move without melting by additionally supplying heat from the heater 140.

The first sensor unit 300 may sense whether the protrusion pin 124 has reached an angle before the protrusion pin 124 is arranged to be vertical to the ground after being in contact with the ice formed by the ice tray, and thus may turn off the heater 140 if the protrusion pin 124 reaches the corresponding angle. Since the time when the heater is turned off may become faster, energy consumed by the ice maker may be saved, and the time required to cool the ice maker may be saved.

Also, the first sensor unit 300 may sense whether the protrusion pin 124 has reached an angle for moving the ice formed by the ice tray 110 at a certain angle, and thus may turn off the heater 140 at the corresponding angle.

The first sensor unit 300 may sense whether the protrusion pin 124 has moved the ice formed by the ice tray at a predetermined angle after the heater 140 has been driven, and thus may turn off the heater 140.

The first sensor unit 300 may sense a first position, a second position and a third position according to the rotation angle of the protrusion pin 124, wherein the angle of the protrusion pin rotated at the first position, the second position and the third position are different from one another. In this case, if the protrusion pin 124 reaches the third position, the heater 140 may be turned off.

In some implementations, the first position may be the initial position where ice separation starts, the second position may be the position where full-ice of the ice bank is sensed, and the third position may be the position where the ice formed by the ice tray moves at a predetermined distance.

If the first sensor unit 300 senses that the protrusion pin 124 has reached the first position, the heater 140 is turned on, whereby ice separation may start.

Figure 23:
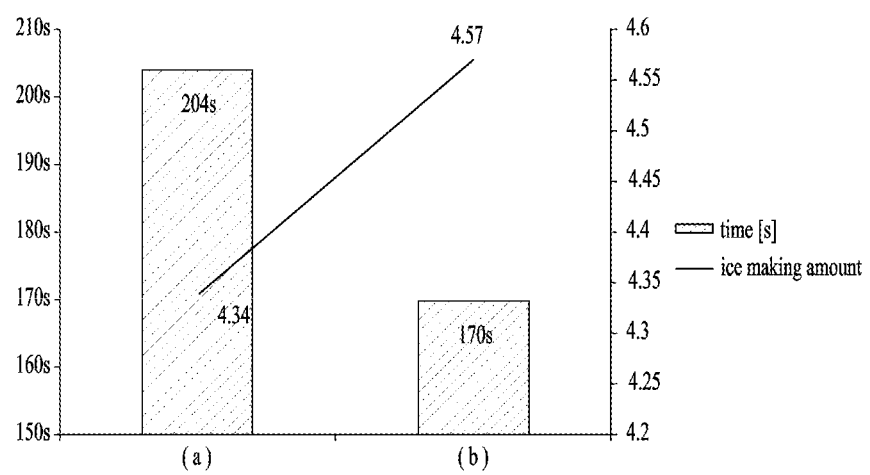
FIG. 23 is a graph illustrating an example effect of the examples described in FIGS. 20A to 21B.

FIG. 23 is a view illustrating an effect of the examples described in FIGS. 20A, 20B, 21A and 21B.

The experimental result according to the implementation of FIGS. 20A and 21A corresponds to (a) in FIG. 23, and the experimental result according to the implementation of FIGS. 20B and 21B corresponds to (b) of FIG. 23.

In FIG. 23, a bar graph represents a heating time of the heater, and a line represents ice making amount.

According to the experimental result of the implementation according to FIGS. 20B and 21B, additional heating of about 30 seconds may be avoided by the heater 140 as compared with the implementation according to FIGS. 20A and 20B. Therefore, it is noted that the heating time by the heater is reduced to 170 s.

As the time required for ice making is reduced, it is noted that the ice making amount is increased from 4.34 lb to 4.57 lb as much as 0.23 lb.

Figure 24:
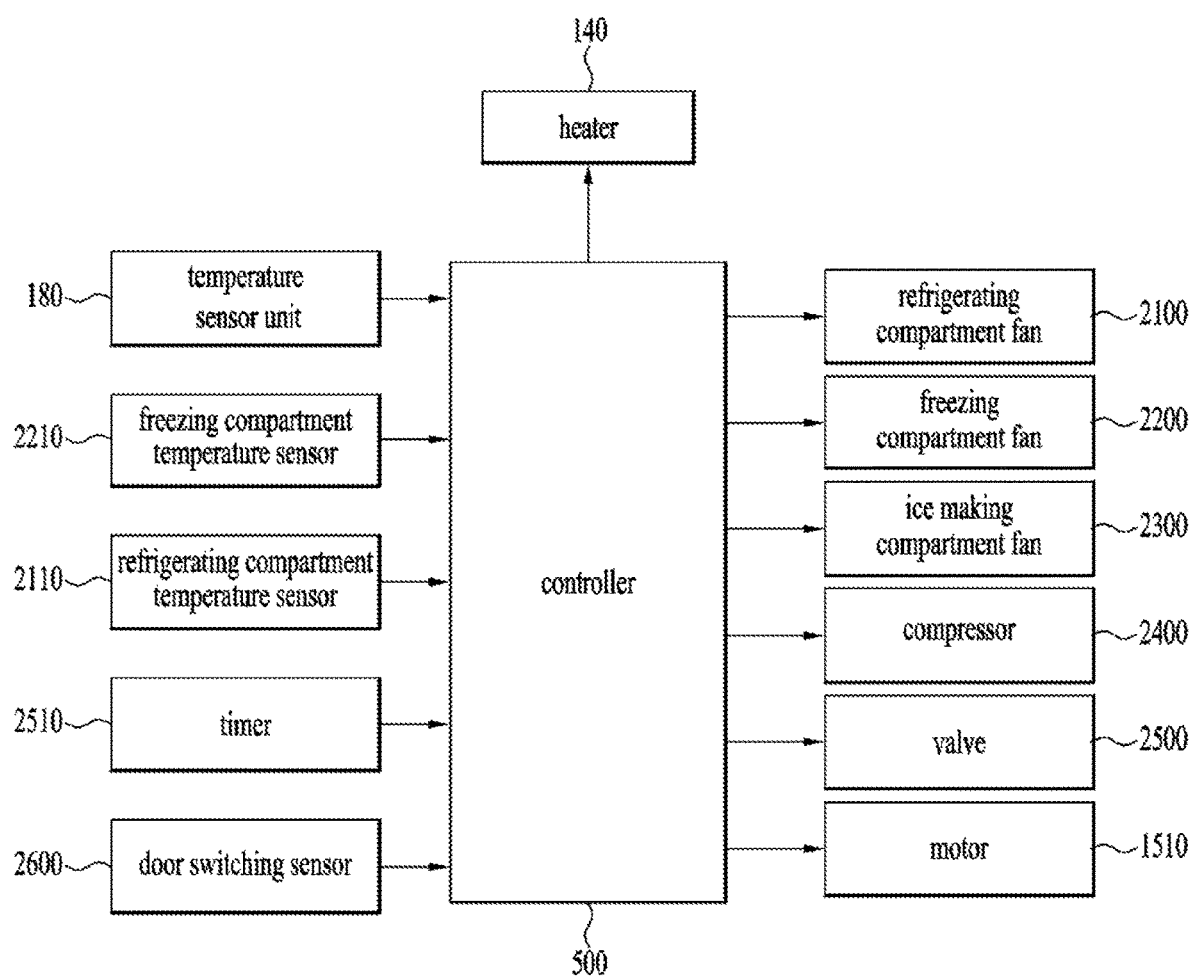
FIG. 24 is a control block diagram illustrating example components of another example refrigerator.

Referring to FIG. 24, the controller 500 may acquire temperature information of the ice maker or the ice tray from the temperature sensor unit 180. The temperature sensor unit 180 includes a temperature sensor 182 that may be attached to the ice tray.

The freezing compartment 20 may be provided with a freezing compartment temperature sensor 2210 for sensing a temperature of a freezing compartment, and the refrigerating compartment 30 may be provided with a refrigerating compartment temperature sensor 2110 for sensing a temperature of a refrigerating compartment. The freezing compartment 20 and the refrigerating compartment 30 may transfer their respective temperature information to the controller 500, and the controller 500 may transfer a command to various elements in accordance with the temperature information.

Also, a timer 2510 may be provided to measure elapsed time. The time measured by the timer 2510 is transferred to the controller 500.

The door for opening or closing storage compartments is provided with a door switching sensor 2600, whereby information on door's opening or closing is also transferred to the controller 500. The door switching sensor 2600 may be provided in each of the freezing compartment door 22 and the refrigerating compartment door 32, whereby the information on door's opening or closing may be acquired. Particularly, the door switching sensor 2600 may be installed in a hinge of the refrigerating compartment door 32 provided with the ice maker. Various examples of the door switching sensor 2600 may include a hall sensor, a reed switch, and a mechanical switch.

The controller 500 may allow the heater 140 to be turned on or off. If the heater 140 is driven, heat is generated and then supplied to the ice tray.

The controller 500 includes a refrigerating compartment fan 2100 for supplying the air cooled by heat exchange with the evaporator to the refrigerating compartment, a freezing compartment fan 2200 for supplying the air cooled by heat exchange with the evaporator to the freezing compartment, and an ice making compartment fan 2300 for supplying the air cooled by heat exchange with the evaporator to the ice making compartment. Since each fan may be driven individually, if each fan is driven, the cool air may be supplied to each corresponding area. The controller 500 may control each fan to be driven or stopped driving.

The controller 500 may command whether to drive the compressor 2400 that is an element of the cooling cycle. When the compressor 2400 is driven, the compressor 2400 may compress a refrigerant and circulate the compressed refrigerant through a cooling cycle. When the compressor 2400 is not driven, the compressor 2400 does not compress the refrigerant, whereby circulation of the refrigerant may be stopped in the cooling cycle.

In some implementations, the controller 500 may control a valve 2500 provided in the cooling cycle, forming a moving path of the refrigerant.

The cooling cycle will be described with reference to FIG. 25.

The refrigerant compressed by the compressor 2400 is guided to the condenser 2420. The compressed refrigerant is cooled while passing through the condenser 2420, and is guided to the valve 2500.

The valve 2500 may include a three-way valve to guide the refrigerant to any one of two paths.

The valve 2500 may guide the refrigerant, which has passed through the condenser 2420, to a first path 2501 and a second path 2502.

The first path 2501 may be provided with a first capillary portion 2440, of which rear end may be provided with a first evaporator 2442. At this time, the first evaporator 2442 may be a refrigerating compartment evaporator for supplying the cool air to the refrigerating compartment. In some implementations, the first evaporator 2442 may be provided with the refrigerating compartment fan 2100 that may supply the air heat-exchanged by the first evaporator 2442 to the refrigerating compartment. The refrigerating compartment fan 2100 may mean a first fan.

The refrigerant evaporated by passing through the first evaporator 2442 may be guided to the compressor 2400. In this way, the refrigerant may be circulated.

The second path 2502 may be provided with a second capillary portion 2450, of which rear end may be provided with a second evaporator 2452. At this time, the second evaporator 2452 may be a freezing compartment evaporator for supplying the cool air to the freezing compartment. The freezing compartment evaporator may also supply the cool air to the ice making compartment. In some implantations, each of the ice making compartment and the freezing compartment maintains a temperature below zero to make ice pieces, the cool air supplied to the ice making compartment and the cool air supplied to the freezing compartment may have the same temperature.

In some implementations, the second evaporator 2452 may be provided with the ice making compartment fan 2300 that may supply the air heat-exchanged by the second evaporator 2452 to the ice making compartment. The ice making compartment fan 2300 may mean a third fan.

If the freezing compartment fan 2200 is driven while the refrigerant is being evaporated by the second evaporator 2452, the cool air may be supplied to the freezing compartment, whereby the temperature of the freezing compartment descends. On the other hand, if the ice making compartment fan 2300 is driven while the refrigerant is being evaporated by the second evaporator 2452, the cool air may be supplied to the ice making compartment, whereby the temperature of the ice making compartment descends.

The refrigerant evaporated by passing through the second evaporator 2452 may be guided to the compressor 2400. In this way, the refrigerant may be circulated.

That is, the refrigerant is circulated in such a manner that the refrigerant which has compressed by the compressor 2400 is guided to either the first path 2501 or the second path 2502 while passing through the valve 2500 and again enters the compressor 2400.

Figure 25:
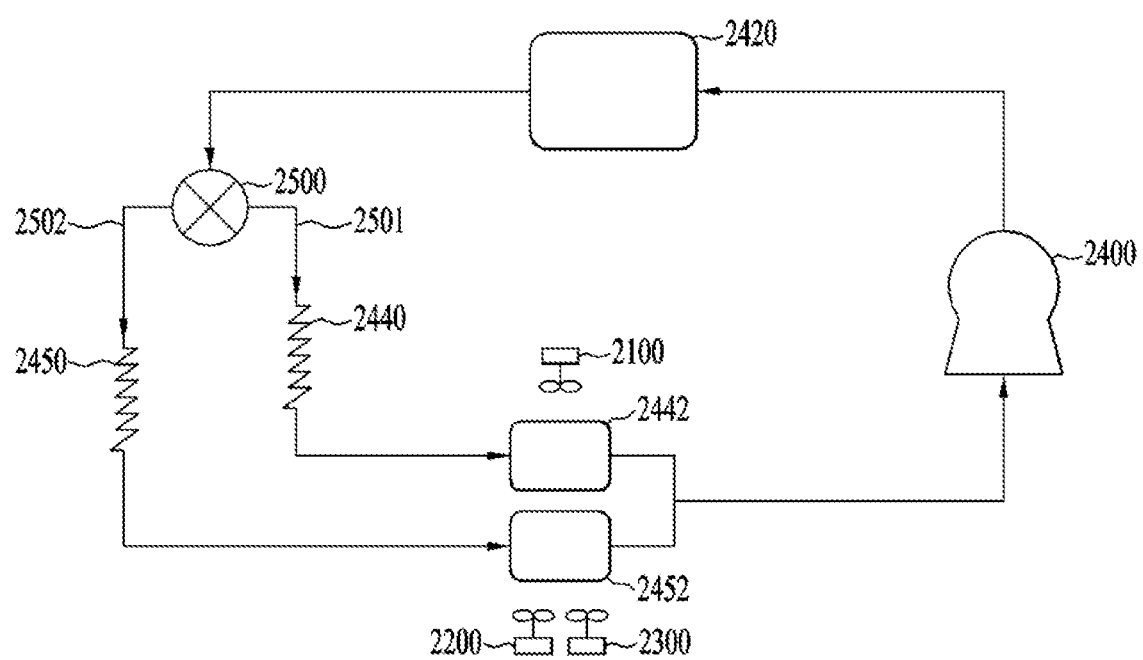
FIG. 25 is a view illustrating an example cooling cycle.
Figure 27:
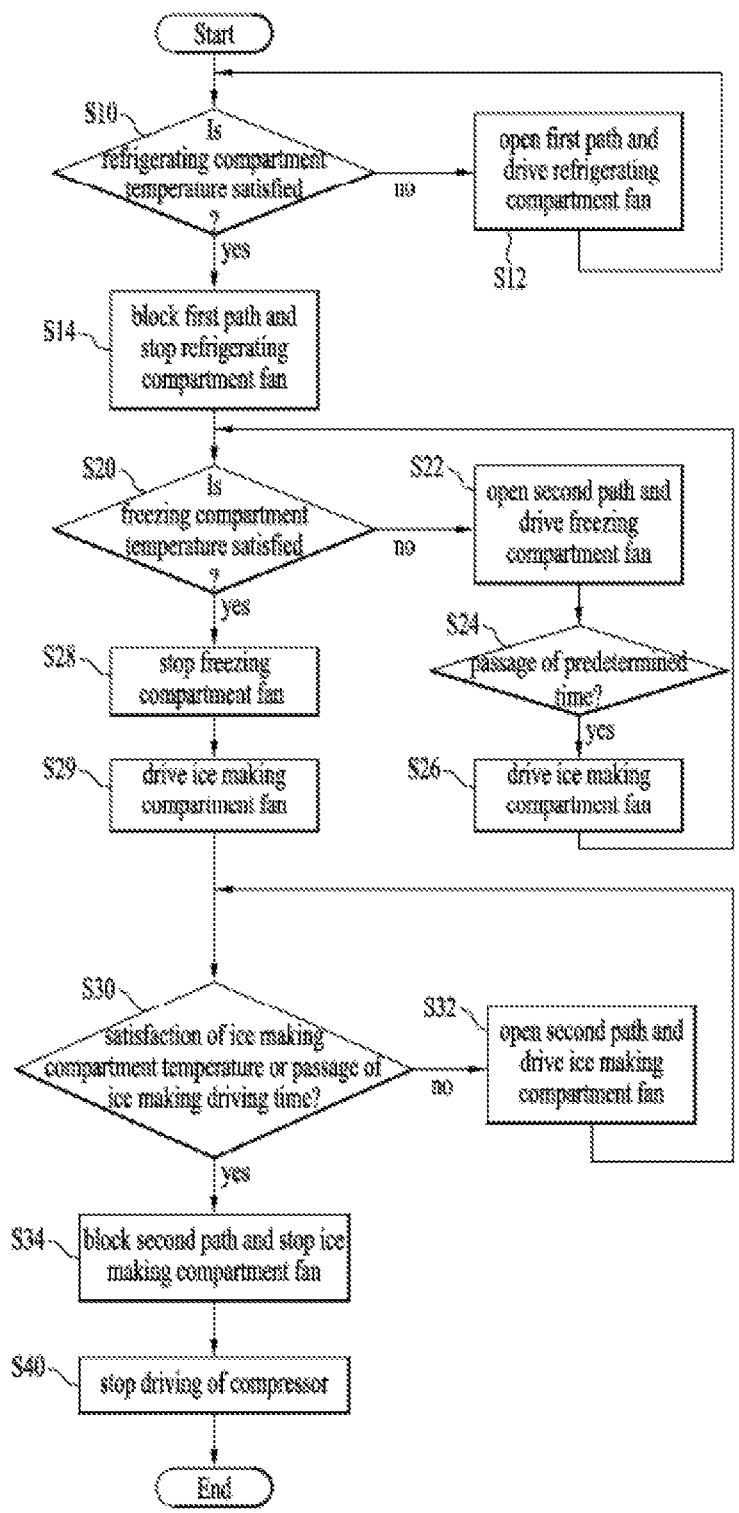
FIG. 27 is a control flow chart illustrating an example process.

Referring to FIGS. 25 to 27, the refrigerator according to one implementation may include a compressor 2400 for compressing a refrigerant, first and second evaporators 2442 and 2452 to which the refrigerant compressed by the compressor 2400 is supplied, and a valve 2500 for forming a path that moves the refrigerant supplied from the compressor 2400 to either the first evaporator 2442 or the second evaporator 242. In some implementations, one compressor 2400 and two evaporators 2442 and 2452 are provided, and the refrigerant compressed by the compressor 2400 may be moved to any one of the two evaporators 2442 and 2452, evaporated in each evaporator and heat-exchanged with the external air, and may cool the external air. Hereinafter, for convenience of description, the first fan 2100 will be referred to as a refrigerating compartment fan, the second fan 2200 will be referred to as a freezing compartment fan, and the third fan 2300 will be referred to as an ice making compartment fan.

The first evaporator 2442 may supply the cool air to the refrigerating compartment, and the second evaporator 2452 may supply the cool air to the freezing compartment or the ice making compartment, or may supply the cool air to both the freezing compartment and the ice making compartment. The first evaporator 2442 may be provided with a refrigerating compartment fan 2100 for generating a fluid for supplying the cool air to the refrigerating compartment. The second evaporator 2452 may be provided with a freezing compartment fan 2200 for generating a fluid for supplying the cool air to the freezing compartment and an ice making compartment fan 2300 for generating a fluid for supplying the cool air to the ice making compartment.

In some implementations, for cooling of the refrigerating compartment, the freezing compartment and the ice making compartment, one implementation includes a first step of sensing whether to satisfy a temperature condition of the refrigerating compartment, a second step of sensing whether to satisfy a temperature condition of the freezing compartment if the first step is satisfied, and a third step of sensing whether to satisfy a temperature condition of the ice making compartment or whether the time required for ice making has passed if the second step is satisfied.

At this time, the compressor may be driven without stop while the second step and the third step are being performed, and driving of the compressor 2400 may be stopped if the third step is satisfied. That is, if the condition for the refrigerating compartment, the freezing compartment and the ice making compartment is satisfied, the compressor 2400 determines that the cool air is not required to be supplied any more, whereby the compressor 2400 may not compress the refrigerant, and may allow the refrigerant not to be circulated in the cooling cycle.

First of all, it is determined whether the temperature condition of the refrigerating compartment is satisfied (S10). At this time, the temperature condition of the refrigerating compartment may mean a refrigerating compartment temperature set by a user. Also, the temperature of the refrigerating compartment corresponds to a temperature lower than the refrigerating compartments temperature set by the user as much as a predetermined temperature, and may mean a temperature that may be maintained at the temperature set by the user after a certain time period passes.

If the temperature condition of the refrigerating compartment is not satisfied, the compressor 2400 is driven to compress the refrigerant. Also, the first path 2501 is opened by the valve 2500, whereby the refrigerant, which has been compressed by the compressor 2400 and has passed through the condenser 2420, is guided to the first path 2501. The refrigerant guided to the first path 2440 may be expanded while passing through the first capillary portion 2440 and heat-exchanged by the first evaporator 2442, whereby the air adjacent to the first evaporator 2442 may be cooled. As the refrigerating compartment fan 2100 is driven, the cool air cooled by the first evaporator 2442 is supplied to the refrigerating compartment, whereby the temperature of the refrigerating compartment may descend (S12).

In some implementations, if the first path 2501 is opened by the valve 2500, the second path 2502 may be blocked. That is, the valve 2500 may open any one of the first path 2501 and the second path 2502 and block the other path.

If the temperature of the refrigerating compartment descends to satisfy the temperature condition of the refrigerating compartment, the valve 2500 blocks the first path 2501 and stops driving of the refrigerating compartment fan 2100 (S14). At this time, since the temperature condition of the refrigerating compartment has been satisfied, driving of the compressor 2400 may be stopped. On the other hand, without stopping driving of the compressor 2400, the compressor 2400 may be driven to reduce its load by lowering RPM.

Subsequently, it is determined whether the temperature condition of the freezing compartment is satisfied (S20). At this time, the temperature condition of the freezing compartment may mean a freezing compartment temperature set by a user. Also, the temperature of the freezing compartment corresponds to a temperature lower than the freezing compartment temperature set by the user as much as a predetermined temperature, and may mean a temperature that may be maintained at the temperature set by the user after a certain time period passes.

If the temperature condition of the freezing compartment is not satisfied, the compressor 2400 is driven to compress the refrigerant. Also, the second path 2502 is opened by the valve 2500, whereby the refrigerant, which has been compressed by the compressor 2400 and has passed through the condenser 2420, is guided to the second path 2502. The refrigerant guided to the second path 2502 may be expanded while passing through the second capillary portion 2450 and heat-exchanged by the second evaporator 2452, whereby the air adjacent to the second evaporator 2452 may be cooled. As the freezing compartment fan 2200 is driven, the cool air cooled by the second evaporator 2452 is supplied to the freezing compartment, whereby the temperature of the freezing compartment may descend (S20).

If the second path 2502 is opened and a predetermined time period passes after the freezing compartment fan 220 is driven (S24), the ice making compartment fan 2300 is driven (S26). A separate duct may be provided at a discharge end of the third fan 2300 during ice making, whereby the fluid generated by the ice making compartment fan 2300 may be guided to the ice making compartment.

If the temperature condition of the freezing compartment is satisfied in S20, driving of the freezing compartment fan 2200 is stopped. That is, it is determined that the cool air is not required to be supplied to the freezing compartment due to sufficient cooling of the freezing compartment, whereby driving of the freezing compartment 2200 is stopped.

Also, the ice making compartment fan 2300 is driven, whereby the cool air is supplied to the ice making compartment (S29). If the temperature condition of the freezing compartment is not satisfied in S20, the freezing compartment fan 2200 is driven, and the ice making compartment fan 2300 is driven if a predetermined time period passes, whereby the cool air starts to be supplied to the ice making compartment. In this case, since the time when the ice making compartment fan 2300 and the freezing compartment fan 2200 are driven together exists, the time when the cool air generated by the second evaporator 2452 is supplied to the freezing compartment and the ice making compartment exists. Since only the freezing compartment fan 2200 is driven initially, the cool air is initially supplied to the freezing compartment only. A detailed control flow related to this case is described in FIG. 26.

On the other hand, if the driving condition of the freezing compartment is satisfied in S20, driving of the freezing compartment fan 2200 does not start. That is, since driving of the freezing compartment fan 220 is stopped, the cool air is not supplied to the freezing compartment. The ice making compartment fan 2300 is driven to supply the cool air to the ice making compartment. In this case, since the time when the freezing compartment fan 2200 and the ice making compartment fan 2300 are driven together does not exist and the freezing compartment is at a sufficiently cooled state, the cool air generated by the second evaporator 2452 is supplied to the ice making compartment only.

Since the temperatures of the refrigerating compartment, the freezing compartment and the ice making compartment generally ascend if the time passes, when each temperature condition is determined, it is likely that most of the temperature conditions are not satisfied. Therefore, it is likely that most of the temperature conditions are managed by the control method according to FIG. 26.

It is determined whether the temperature condition of the ice making compartment is satisfied or the driving time for ice making passes (S30). Even though any one of the two conditions is satisfied, it may be determined that the condition in S30 is satisfied.

At this time, the temperature condition of the ice making compartment may mean the ice making compartment temperature set by the user. Also, the ice making compartment temperature may mean a temperature that is set by a worker who has manufactured a refrigerator to freeze water within a short time.

In some implementations, the driving time for ice making is the driving time set by the worker, and may be set considering the amount of ice pieces to be supplied per day. The driving time for ice making may mean the time when ice pieces can be generated when the cool air is supplied. That is, in some implementations, even though the temperature of the ice making compartment does not descend sufficiently to satisfy the temperature condition of the ice making compartment, if the driving time for ice making passes, the cool air is not supplied to the ice making compartment any more.

If the temperature condition of the ice making compartment is not satisfied or the driving time for ice making does not passes, the compressor 2400 is driven to compress the refrigerant. Also, the second path 2502 is opened by the valve 2500, whereby the refrigerant compressed by the compressor 2400, passing through the condenser 2420 is guided to the second path 2502. The refrigerant guided to the second path 2502 may be expanded while passing through the second capillary portion 2450 and heat-exchanged by the second evaporator 2452, whereby the air adjacent to the second evaporator 2452 may be cooled. As the ice making compartment fan 2300 is driven, the cool air cooled by the second evaporator 2452 is supplied to the ice making compartment, whereby the temperature of the ice making compartment may descend (S32). Therefore, water received in the ice tray may be phase-changed to ice.

If the corresponding condition is satisfied in S30, the second path 2502 is blocked, whereby the refrigerant may not move to the second path 2502 any more. Also, driving of the ice making compartment fan 2300 is stopped, whereby the air cooled by the second evaporator 2452 is blocked from being guided to the ice making compartment (S34).

Since the refrigerating compartment, the freezing compartment and the ice making compartment have been sufficiently cooled, driving of the compressor 2400 is stopped (S40).

In some implementations, even though the temperature condition of the freezing compartment is satisfied, driving of the compressor 2400 is not stopped, and the ice making compartment fan 2300 is driven. Therefore, as soon as the ice making compartment fan 2300 is driven, the air cooled by the second evaporator 2452 may be supplied to the ice making compartment, whereby the temperature of the ice making compartment may quickly descend, and the time required to generate ice pieces may be reduced.

Figure 28:
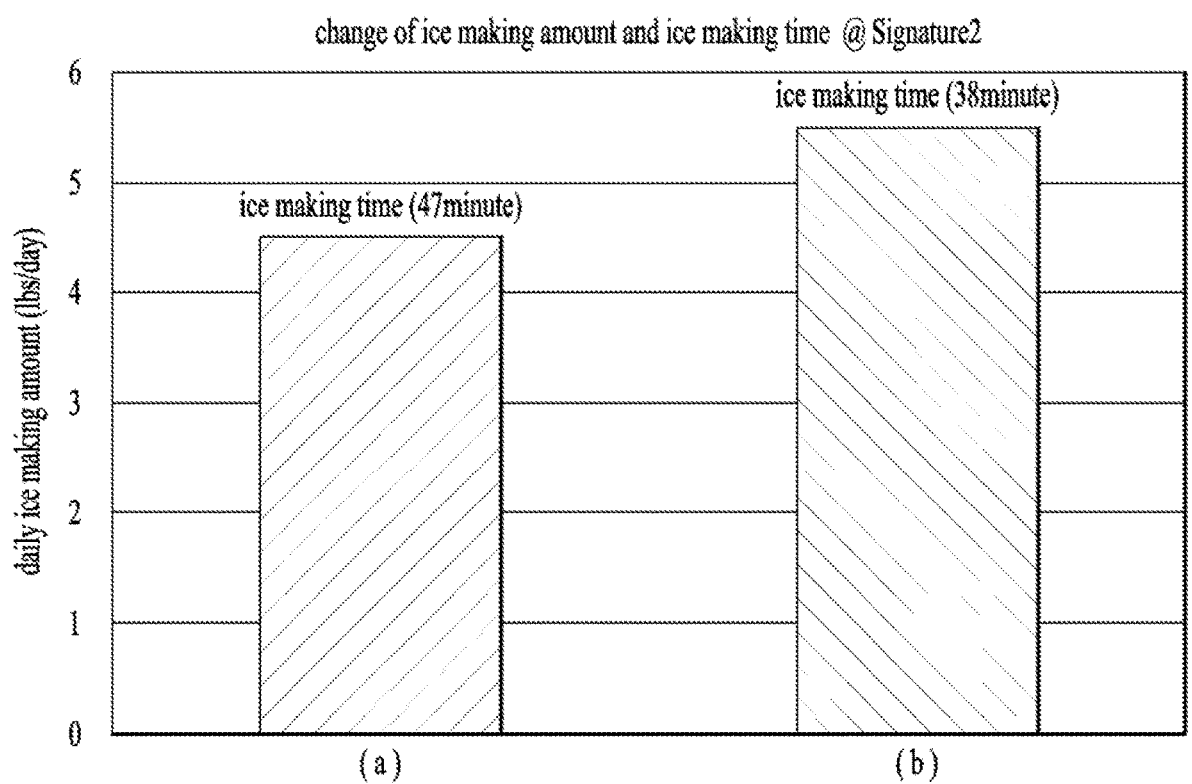
FIG. 28 is a view illustrating an effect of an example process.

In FIG. 28, an experimental result (b) of FIG. 28 according to one implementation and the existing an experimental result (a) of FIG. 28 according to the related art are compared with each other.

In the related art experimental result (a) of FIG. 28, if the freezing compartment temperature is satisfied, driving of the compressor 2400 is stopped. Also, before the temperature condition of the freezing compartment is satisfied, the ice making compartment fan 2300 is driven for a certain time period, and then if the temperature condition of the freezing compartment is satisfied, driving of the ice making compartment fan 2300 and driving of the freezing compartment fan 2200 are stopped together.

In the experimental result (b) of FIG. 28 of one implementation, even though the freezing compartment temperature descends to a set temperature as described above, driving of the compressor 2400 is not stopped. In some implementations, driving of the compressor 2400 may be stopped only if the temperature condition of the ice making compartment is satisfied or the driving time for ice making is satisfied. Therefore, the driving time of the compressor 2400 may be more increased than the existing compressor, whereby the cool air may be more generated.

Also, since the time when the ice making compartment fan 2300 is driven while the freezing compartment fan 2200 is not driven exists, the cool air generated by the second evaporator 2452 is supplied to the ice making compartment only without being supplied to the freezing compartment. Therefore, since the cool air may be concentrated on the ice making compartment, the temperature of the ice making compartment rapidly descends, whereby ice pieces may quickly be generated.

The time required for ice making is 47 minutes in the related art experimental result (a) of FIG. 28, whereas the time required for ice making is reduced to 38 minutes in the experimental result (b) of FIG. 28 of one implementation, whereby it is noted that the time for ice making is reduced to 9 minutes.

Also, a daily amount for ice making is 4.5 lbs/day, approximately, in the related art experimental result (a) of FIG. 28, whereas a daily amount for ice making is 5.5 lbs/day in the experimental result (b) of FIG. 28 of one implementation, whereby it is noted that the amount of ice pieces that may be provided per day has been increased.

Since the time for concentrating the cool air on the ice making compartment exists in one implementation, the time required to generate ice pieces may be reduced, and more ice pieces may be generated. Also, since the time required to supply the cool air to the ice making compartment may be increased, the time required to generate ice pieces may be reduced, and more ice pieces may be generated.

Another implementation will be described with reference to FIG. 29. In another implementation of FIG. 29, the ice making compartment fan is not driven for a certain period while ice separation is being made. If the ice making compartment fan is driven while heat is being generated by the heater, heat of the heater is dispersed and the temperature of the ice tray 110 fails to be increased sufficiently, whereby ice pieces may not be separated from the ice tray 110.

Also, as heat generated from the heater 140 is dispersed inside the ice making compartment by movement of the air generated by the ice making compartment fan, the temperature inside the ice making compartment ascends. After ice separation is completed, more cool air may be supplied when the ice making compartment is cooled to generate ice pieces in the ice tray 110, whereby a problem occurs in that energy efficiency is deteriorated. Therefore, in some implementations, the heater is driven, and driving of the ice making compartment fan is stopped for a certain time when heat is supplied from the heater, whereby heat of the heater is supplied to the ice tray only without being forcibly dispersed to other areas. As a result, energy efficiency is improved.

In some implementations, the refrigerator may include an ice tray 110 for receiving water to generate ice pieces, a motor 1510 capable of being rotated in a forward or reverse direction, an ejector 120 including a rotary shaft 122 rotating ice pieces made in the ice tray 110 to discharge the ice pieces from the ice tray 110, rotated by being axially connected to the motor 1510 and a protrusion pin 124 protruded in a radius direction of the rotary shaft 122 to adjoin the ice pieces, and a heater 140 for selectively supplying heat to the ice tray 110.

In some implementations, the rotation path of the ejector and the rotation gear of the ejector, which are described with reference to FIGS. 20A to 21B, are used.

First of all, the ejector 120 may be rotated to sense whether the ice pieces separated from the ice tray 110 are received in the ice bank 42 at a set height. That is, the ejector 120 is rotated to sense whether the ice bank 42 is fully filled with ice pieces (S100). To sense whether the ice bank 42 is fully filled with ice pieces, the motor 1510 may be rotated in a reverse direction so that the full-ice sensing bar 170 of the ejector 120 may be rotated. At this time, the protrusion pin 124 is rotated from a position 1 to a position 2 in FIGS. 20A and 20B.

As the full-ice sensing bar 170 is rotated, a space where ice pieces will be added exists in the ice tray 110. That is, if it is sensed that the ice bank 42 is not fully filled with ice pieces, the motor 1510 is rotated in a forward direction (direction opposite to full-ice), whereby the protrusion pin 124 may be rotated counterclockwise and moved from the position 2 to the position 1. At this time, the position 1 may mean a first setup position.

It is determined whether the ejector 120 is rotated and reaches a first setup position (S110).

As the ejector 120 is rotated, if the protrusion pin 1240 reaches the first setup position, the heater 140 is driven to supply heat to the ice tray 110, whereby the ice tray 110 is heated. Therefore, a corresponding surface of ice adjacent to the ice tray 110 may be melted and changed to water, and if a certain amount of heat is additionally supplied, the ice may be separated from the ice tray 110.

The operation of the ice making compartment fan 2300 is stopped. If the ice making compartment fan 2300 is being driven, driving of the ice making compartment fan 2300 is stopped. On the other hand, if the ice making compartment fan 2300 is not driven, the state that the ice making compartment fan 2300 is not driven is maintained (S120).

As the ejector 120 may be rotated, whether the protrusion pin 124 reaches the first setup position may be determined through the ejector rotation gear 1520 shown in FIGS. 21A and 21B. When a groove formed in the ejector rotation gear 1520 is engaged with a cam portion, it may be sensed that the protrusion pin 124 has reaches the first setup position.

In some implementations, the heater 140 may be driven, and at the same time driving of the ice making compartment fan 2300 may be stopped. If the heater 140 starts to be driven, the heater 140 generates heat. Therefore, as the ice tray 110 is heated, the temperature of the ice making compartment may be increased. In this implementation, since the ice making compartment fan 2300 is not driven while the heater 140 is being driven, heat generated from the heater 140 is not dispersed inside the ice making compartment by forced convection caused by the ice making compartment fan 2300. Therefore, the temperature of the ice making compartment may be prevented from being rapidly increased. Also, the temperature of the refrigerating compartment may be prevented from being increased by increase of a peripheral temperature, or ice pieces stored in the ice bank may be prevented from being melted by heat of the heater.

The state that the ejector 120 continues to be rotated is maintained.

As the ejector 120 is rotated, if the protrusion pin 124 reaches a second setup position (position 4) (S130), driving of the heater 140 may be stopped. Since the protrusion pin 124 has separated ice pieces from the ice tray 110, it is determined that ice pieces may be separated from the ice tray 110 even though heat is not supplied from the heater 140 additionally. Therefore, the heater 140 may be turned off, whereby energy consumed by the heater 140 may be reduced. Also, the temperature of the ice making compartment may be prevented from being additionally increased by heat of the heater 140, whereby the amount of the cool air required for ice making may be reduced.

In a state that the heater 140 is turned off, the ice making compartment fan 2300 starts to be driven (S140). If the ice making compartment fan 2300 is driven, movement of the air is generated, whereby the temperature of the ice tray 110, which is relatively high inside the ice making compartment, may descend through heat exchange with another portion.

In some implementations, since the ice making compartment fan 2300 is not driven while the heater 140 is being driven, the power consumed by the ice making compartment fan 2300 may be reduced.

In some implementations, while ice separation is being made, the ice making compartment fan is not driven for the time when the heater is driven. That is, if the heater 140 is driven, the ice making compartment fan 2300 is not driven, and the heater 140 is not driven while the ice making compartment fan 2300 is being driven.

In some implementations, after the ice making compartment fan 2300 is turned on, the ejector 120 continues to be rotated and the protrusion pin 124 is also rotated counter-clockwise, whereby ice pieces formed in the ice tray 110 may be discharged from the ice tray 110.

Figure 29:
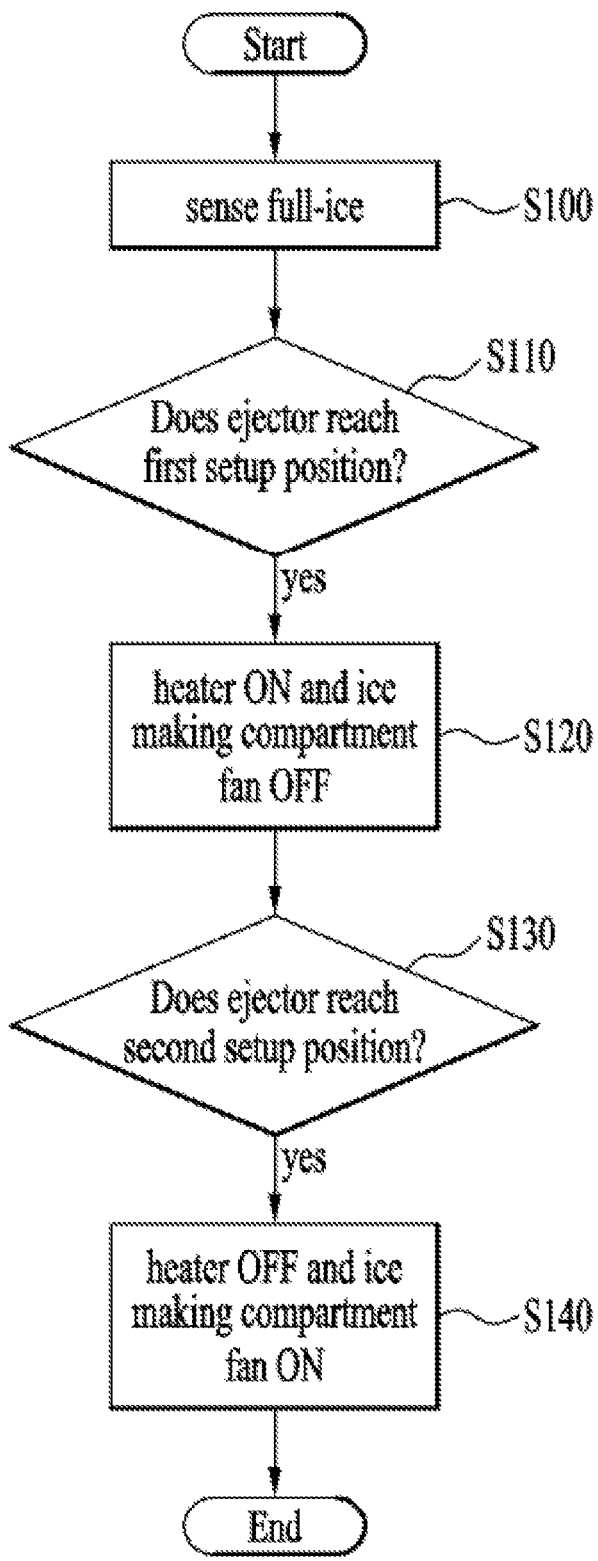
FIG. 29 is a control flow chart illustrating another example process.
Figure 30:
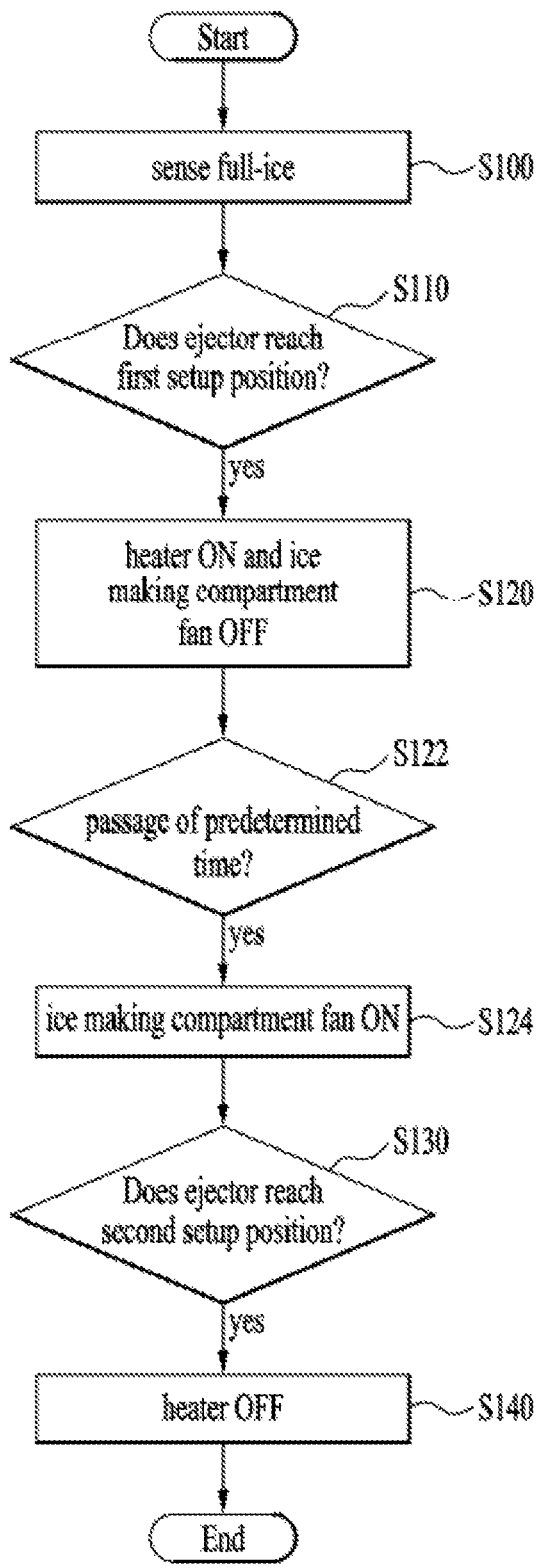
FIG. 30 is a control flow chart illustrating an example process modified from FIG. 29.

FIG. 30 illustrates a modified example of FIG. 29. Unlike the implementation of FIG. 29, the ice making compartment fan 2300 is driven for a part of a period where the heater 140 is driven in the implementation of FIG. 30.

The same portion as that of FIG. 29 will be described in brief, and the implementation of FIG. 30 will be described based on a difference from FIG. 29.

If ice separation starts, full-ice is sensed (S100).

As the ejector 120 is rotated to determine whether the protrusion pin 124 has reached the first setup position (S110). If the protrusion pin 124 reaches the first setup position, the heater 140 is turned on, and driving of the ice making compartment fan 2300 is stopped.

It is determined whether a predetermined time has passed after the heater 140 had turned on (S122). At this time, the predetermined time may mean the time passed after driving of the ice making compartment fan 2300 had been stopped.

If the predetermined time passes, the ice making compartment fan 2300 is driven (S124). That is, the ice making compartment fan 2300 starts to be driven in a state that the heater 140 is not turned off, whereby heat generated by the heater 140 may quickly be cooled.

At this time, the predetermined time may mean the time when the protrusion pin of the ejector 120 moves from the first setup position to the second setup position, and may be shorter than the time when the protrusion pin reaches the second setup position. Of course, the time when the protrusion pin reaches the second setup position may be equal to the predetermined time.

It is determined whether the ejector 120 has been rotated to reach the second setup position (S130), and if the ejector 120 reaches the second setup position, the heater 140 is turned off (S140).

Figure 31:
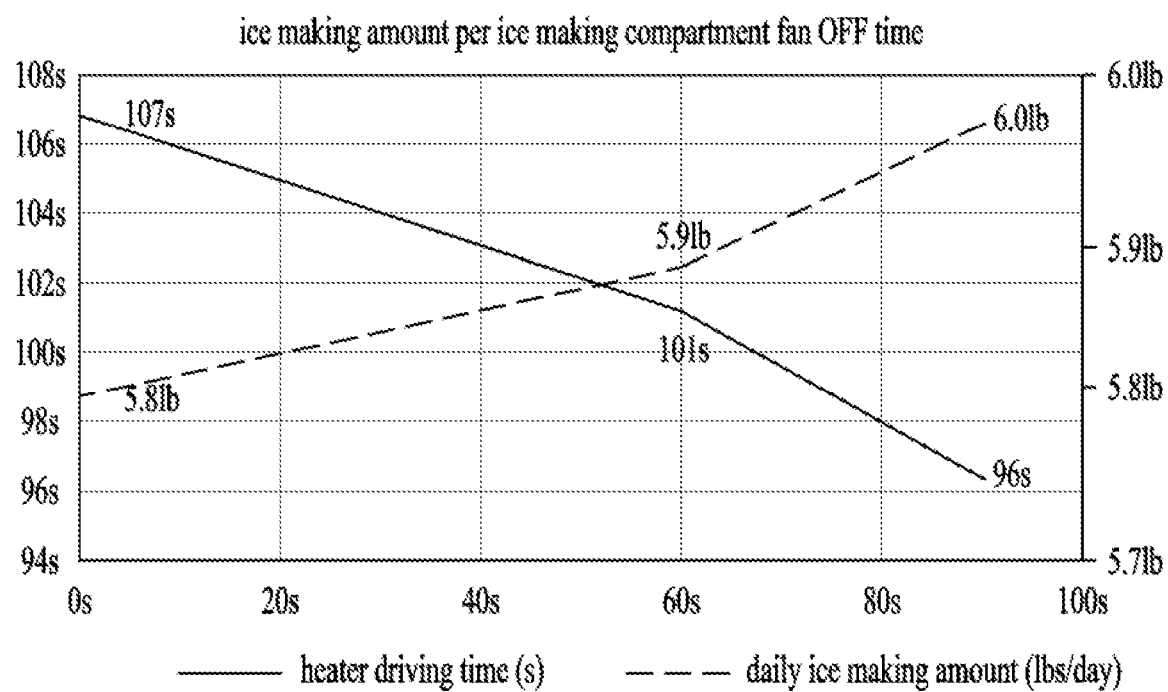
FIG. 31 is a view illustrating an effect of the examples described in FIGS. 29 and 30.

FIG. 31 is a view illustrating an effect of the implementations described in FIGS. 29 and 30, especially the effect of the implementation according to FIG. 30.

In FIG. 31, X-axis represents the time when driving of the ice making compartment fan is stopped. A solid line represents the driving time of the heater, and a dotted line represents a daily ice making amount which is the amount of ice pieces generated per day.

As noted from FIG. 31, as the time when the ice making compartment fan 2300 is turned off becomes longer, the driving time of the heater becomes shorter, and a daily ice making amount is increased. That is, it is noted that, if the time when the ice making compartment fan 2300 is turned off reaches 90 seconds, the ice making amount is increased as much as 0.2 lb as compared with the other cases and the driving time of the heater may be reduced as much as 10 seconds.

Therefore, according to this implementation, it is noted that the ice making amount may be more increased than that of the related art.

Figure 32:
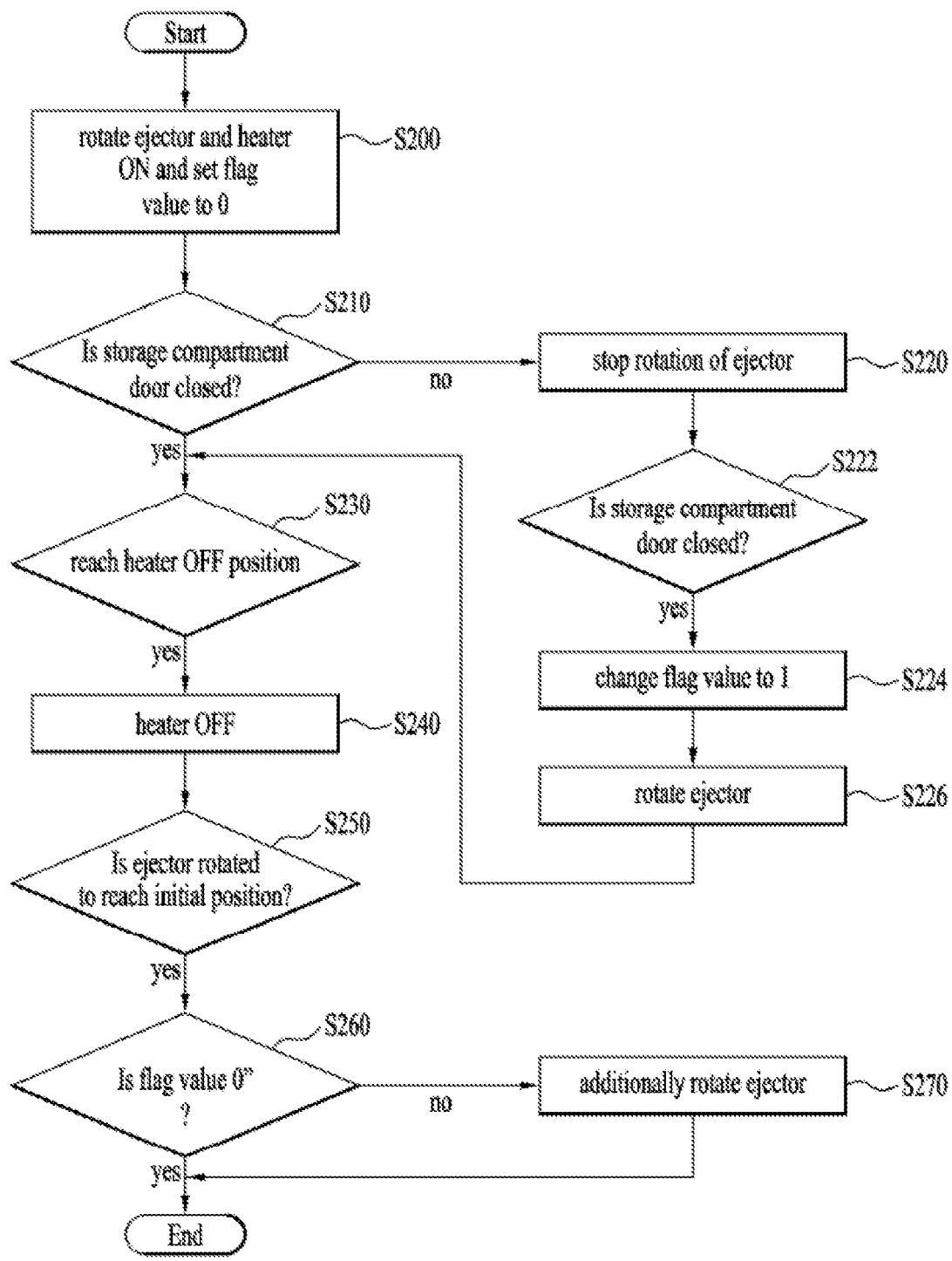
FIG. 32 is a control flow chart illustrating another example process.

Still another implementation will be described with reference to FIG. 32.

In still another implementation, the refrigerator may include an ice tray 110 for receiving water to generate ice pieces, a motor 1510 capable of being rotated in a forward or reverse direction, an ejector 120 including a rotary shaft 122 rotating ice pieces made in the ice tray 110 to discharge the ice pieces from the ice tray 110, rotated by being axially connected to the motor 1510 and a protrusion pin 124 protruded in a radius direction of the rotary shaft 122 to adjoin the ice pieces, a heater 140 for selectively supplying heat to the ice tray 110, and a door switching sensor 2600 for sensing a storage compartment door's opening or closing, the storage compartment door being provided with the ejector.

In this implementation, if the door in which the ice tray 110 is opened or closed, the ejector is rotated twice, whereby reliability in that the ice pieces are discharged from the ice tray may be improved. The ejector is provided in the door, and if the door is opened or closed, the ejector moves along with the door. This is because that ice pieces formed in the ice tray may return to the ice tray without being discharged from the ice tray in a special case if the ejector moves along with the door and at the same time is rotated to discharge the ice pieces formed in the ice tray.

On the other hand, if the door is maintained at a closed state without being opened or closed, the ejector is rotated once. That is, if the door is maintained at a closed state without being opened or closed, the ejector provided in the door is rotated without moving along the door. Since it is not likely that ice pieces are not discharged from the ice tray, waste of time may occur if the ejector is rotated twice.

Therefore, in this implementation, whether the door is opened or closed may be sensed, whereby RPM of the ejector may be implemented differently.

First of all, for ice separation, the ejector starts to be rotated (S100). Prior to ice separation, the full-ice sensing bar is rotated to sense full-ice, whereby it may be sensed whether ice pieces are filled with the ice bank at a set height or more.

If the ejector 120 is rotated and thus the protrusion pin 124 moves to a set position, the heater 140 is driven to supply heat to the ice tray 110 (S200).

A flag value is set to 0. In the flag value, 0 is an initial setup value, and the flag value may be set to other various values.

While the ejector 120 is being rotated, it is determined whether the storage compartment door is closed (S210). The storage compartment door may mean the door provided with the ejector 120. The storage compartment door may mean the refrigerating compartment door. Also, the storage compartment door may mean the door provided with the ice making compartment.

At this time, the door switching sensor 2600 may sense whether the storage compartment door is closed, and then may transmit related information to the controller 500. The door switching sensor 2600 may be installed in a hinge unit which serves as a shaft for rotating the storage compartment, or may be installed in a portion where the door adjoins a cabinet. Therefore, the door switching sensor 2600 may sense whether the storage compartment door is maintained to seal the storage compartment.

The state that the storage compartment door is closed may mean the state that the storage compartment door is stopped after sealing the storage compartment. The state that the storage compartment door is not closed may include any one of the state that the storage compartment door is stopped at an opened state, the state that the storage compartment door is rotated to be opened, and the state that the storage compartment door is rotated to close the storage compartment.

If it is sensed that the storage compartment door is not closed in S210, rotation of the ejector 120 is stopped (S220). This is because that an unnecessary force may be given to a user who holds the door when the ejector 120 is rotated in a state that the door is moving. Also, a force for rotating the ejector 120 and a force for rotating the door may be overlapped with each other, whereby ice pieces may return to the ice tray 110 without being discharged from the ice tray 110.

If it is sensed that the storage compartment door is closed in a state that rotation of the ejector 120 is stopped (S222), the flag value is changed to another value not 0, that is, 1. If the value corresponding to 1 is another value different from the initial setup value, any value may be used as the value corresponding to 1.

The ejector 120 is rotated (S226). The ejector 120 is maintained in a state that its rotation is stopped in S220, and then starts to be rotated at that position. Therefore, even though rotation of the ejector 120 is stopped in S220, the protrusion pin 124 of the ejector 120 is not required to move to an initial position or a specific position.

If it is sensed that the storage compartment door is closed in S210, the ejector 120 continues to be rotated without stop. The protrusion pin 124 may be rotated counterclockwise to reach position 4 of FIG. 20B, for example. That is, if the protrusion pin 124 is rotated to reach a preset position for stopping driving of the heater 140 (S240), driving of the heater 140 is stopped (S240).

In S200, if the protrusion pin 124 of the ejector 120 reaches the first setup position, the heater is driven. Afterwards, if the protrusion pin 124 continues to be rotated to finally reach a second setup position, driving of the heater is stopped. That is, the heater is turned off.

In some implementations, even though it is determined that the storage compartment door is not closed in S210, since the ejector is again rotated in S226, the protrusion pin 124 reaches the second setup position in S230. Likewise even in this case, driving of the heater is stopped.

As the ejector continues to be rotated, the protrusion pin 124 reaches the initial position. If the ejector 120 is rotated to reach the initial position (S250), it is checked whether the flag value set as above is 0 (S260).

If the flag value is 1 not 0, the ejector is additionally rotated once more (S270). At this time, the protrusion pin 124 starts to be rotated from the first setup position which is the initial position, and is again rotated to reach the first setup position which is the initial position. In this second rotation, the heater 140 is not driven, and the ejector is only rotated.

Since it is determined that the time when the ejector is rotated while the door is being rotated exists, for ice separation, it is not required to additionally ice pieces attached to the ice tray 110. This is because that the ejector is rotated to discharge ice pieces, which may remain in the ice tray 110, from the ice tray 110.

On the other hand, if the flag value is 0 which is initially set, since the storage compartment door seals the storage compartment in a state that the storage compartment door is stopped while the ejector is being rotated, it is not likely that ice pieces may remain in the ice tray due to one-time rotation of the ejector. Therefore, the ejector may be rotated once to increase the time required for ice making. This is because that ice pieces cannot be generated even though the ice making compartment 2300 is driven to supply the cool air as water is not supplied to the ice tray while the ejector is being rotated and the ice tray is not filled with water.

In some implementations, one rotation may mean that the protrusion pin of the ejector is rotated at 360° or more based on the rotary shaft 122.

In some implementations, if it is likely that ice pieces may remain in the ice tray, the ejector is rotated twice, and if not so, the ejector is rotated once, whereby the time required for ice making may be increased to increase the ice making amount.

Even though the ejector is rotated continuously twice, the heater is not driven during a second rotation of the ejector, whereby energy consumed by the heater may be saved.

It will be apparent to those skilled in the art that the present disclosure may be embodied in other specific forms without departing from the spirit and essential characteristics of the disclosure. Thus, the above implementations are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A control method of a refrigerator that includes a compressor configured to compress refrigerant, a first evaporator and a second evaporator that are configured to receive the refrigerant compressed by the compressor, and a valve that defines a path configured to allow the refrigerant supplied from the compressor to move to the first evaporator or to the second evaporator, the control method comprising:
   determining whether a first temperature of a refrigerating compartment of the refrigerator satisfies a first temperature condition of the refrigerating compartment;
   based on a determination that the first temperature satisfies the first temperature condition, determining whether a second temperature of a freezing compartment of the refrigerator satisfies a second temperature condition of the freezing compartment;
   based on a determination that the second temperature satisfies the second temperature condition, determining (i) whether a third temperature of an ice making compartment of the refrigerator satisfies a third temperature condition of the ice making compartment and (ii) whether a driving time for ice making has passed;
   maintaining operation of the compressor while determining (i) whether the second temperature satisfies the second temperature condition, (ii) whether the third temperature satisfies the third temperature condition, and (iii) whether the driving time for ice making has passed; and stopping operation of the compressor based on at least one of (i) a determination that the third temperature satisfies the third temperature condition or (ii) a determination that the driving time for ice making has passed.

2. The control method of the refrigerator according to claim 1, further comprising:

opening a first path of the valve to allow the refrigerant to move to the first evaporator based on a determination that the first temperature does not satisfy the first temperature condition.

3. The control method of the refrigerator according to claim 1, further comprising:

driving a first fan of the refrigerator configured to blow air cooled by the first evaporator to the refrigerating compartment based on a determination that the first temperature does not satisfy the first temperature condition.

4. The control method of the refrigerator according to claim 1, further comprising:

opening a second path of the valve to allow the refrigerant to move to the second evaporator based on a determination that the second temperature does not satisfy the second temperature condition.

5. The control method of the refrigerator according to claim 1, further comprising:

driving a second fan of the refrigerator configured to blow air cooled by the second evaporator to the freezing compartment based on a determination that the second temperature does not satisfy the second temperature condition.

6. The control method of the refrigerator according to claim 5, further comprising:

stopping driving the second fan based on a determination that the second temperature satisfies the second temperature condition.

7. The control method of the refrigerator according to claim 5, further comprising:

driving a third fan of the refrigerator configured to blow air cooled by the second evaporator to the ice making compartment based on a determination that the second temperature satisfies the second temperature condition.

8. The control method of the refrigerator according to claim 7, wherein driving the third fan comprises driving the third fan for a period time without driving the second fan to supply cool air to the ice making compartment for the period time and to not supply cool air to the freezing compartment for the period time.

9. The control method of the refrigerator according to claim 1, further comprising:

opening a second path of the valve to allow the refrigerant to move to the second evaporator based on at least one of (i) a determination that the third temperature does not satisfy the third temperature condition or (ii) a determination that the driving time for ice making has not passed.

10. The control method of the refrigerator according to claim 1, further comprising:

driving a third fan of the refrigerator configured to blow air cooled by the second evaporator to the ice making compartment based on at least one of (i) a determination that the third temperature does not satisfy the third temperature condition or (ii) a determination that the driving time for ice making has not passed.

11. The control method of the refrigerator according to claim 1, further comprising:

closing a second path of the valve to restrict the refrigerant from moving to the second evaporator based on at least one of (i) a determination that the third temperature satisfies the third temperature condition or (ii) a determination that the driving time for ice making has passed.

12. A refrigerator comprising:

a compressor configured to compress refrigerant;

a first evaporator and a second evaporator that are configured to receive the refrigerant compressed by the compressor;

a valve that defines a path that allows the refrigerant supplied from the compressor to move to the first evaporator or to the second evaporator;

a first fan configured to blow air cooled by the first evaporator to a refrigerating compartment of the refrigerator;

a second fan configured to blow air cooled by the second evaporator to a freezing compartment of the refrigerator;

a third fan configured to blow air cooled by the second evaporator to an ice making compartment of the refrigerator; and a controller configured to:
open and close the path of the valve,
determine (i) whether a temperature of the ice making compartment satisfies a temperature condition of the ice making compartment and (ii) whether a driving time for ice making has passed,
based on at least one of (i) a determination that the temperature of the ice making compartment does not satisfy the temperature condition or (ii) a determination that the driving time for ice making has not passed, open the path of the valve to allow the refrigerant to move to the second evaporator and drive the compressor and the third fan, and
stop operation of the compressor based on at least one of (i) a determination that the temperature of the ice making compartment satisfies the temperature condition of the ice making compartment or (ii) a determination that the driving time for ice making has passed.

13. The refrigerator according to claim 12, wherein the controller is further configured to stop driving the second fan based on a temperature of the freezing compartment satisfying a temperature condition of the freezing compartment.

14. The refrigerator according to claim 12, wherein the controller is further configured to drive the third fan without driving the second fan for a period of time to supply cool air to the ice making compartment and to not supply cool air to the freezing compartment for the period of time.

15. The refrigerator according to claim 12, wherein the controller is further configured to:

determine whether a first temperature of the refrigerating compartment satisfies a first temperature condition;

based on a determination that the first temperature satisfies the first temperature condition, determine whether a second temperature of the freezing compartment satisfies a second temperature condition of the freezing compartment;

based on a determination that the second temperature satisfies the second temperature condition, determine (i) whether the temperature of the ice making compartment satisfies the temperature condition of the ice making compartment or (ii) whether the driving time for ice making has passed.

16. The refrigerator according to claim 15, wherein the controller is further configured to:
   open a first path of the valve to allow the refrigerant to move to the first evaporator based on a determination that the first temperature does not satisfy the first temperature condition.

17. The refrigerator according to claim 15, wherein the controller is further configured to:
   drive the first fan based on a determination that the first temperature does not satisfy the first temperature condition.

18. The refrigerator according to claim 15, wherein the controller is further configured to:
   open a second path of the valve to allow the refrigerant to move to the second evaporator based on a determination that the second temperature does not satisfy the second temperature condition.

19. The refrigerator according to claim 15, wherein the controller is further configured to:
   drive the second fan based on a determination that the second temperature does not satisfy the second temperature condition.

20. The refrigerator according to claim 15, wherein the controller is further configured to:
   maintain operation of the compressor while determining (i) whether the second temperature of the freezing compartment of the refrigerator satisfies the second temperature condition of the freezing compartment, (ii) whether a third temperature of the ice making compartment of the refrigerator satisfies a third temperature condition of the ice making compartment, and (iii) whether the driving time for ice making has passed.

* * * * *